(12) United States Patent
Venkataraman

(10) Patent No.: US 10,776,094 B2
(45) Date of Patent: Sep. 15, 2020

(54) COMPUTER IMPLEMENTED SYSTEM AND METHOD FOR ENCODING CONFIGURATION INFORMATION IN A FILENAME

(71) Applicant: COLORTOKENS, INC., Santa Clara, CA (US)

(72) Inventor: Natarajan Venkataraman, Bangalore (IN)

(73) Assignee: COLORTOKENS, INC. CA (US)

( * ) Notice: Subject to any disclaimer, the term of this patent is extended or adjusted under 35 U.S.C. 154(b) by 17 days.

(21) Appl. No.: 16/048,334

(22) Filed: Jul. 29, 2018

(65) Prior Publication Data

US 2020/0034129 A1     Jan. 30, 2020

(51) Int. Cl.
| | |
|---|---|
| G06F 8/61 | (2018.01) |
| G06F 21/64 | (2013.01) |
| H04L 29/08 | (2006.01) |
| H04L 9/32 | (2006.01) |
| G06F 9/445 | (2018.01) |
| G06F 21/57 | (2013.01) |

(52) U.S. Cl.
CPC ............ *G06F 8/61* (2013.01); *G06F 9/44505* (2013.01); *G06F 21/57* (2013.01); *G06F 21/64* (2013.01); *H04L 9/3247* (2013.01); *H04L 67/34* (2013.01)

(58) Field of Classification Search
CPC ........ G06F 8/61; G06F 9/44505; G06F 21/57; G06F 21/64; H04L 9/3247; H04L 67/34
USPC ....................................................... 717/178
See application file for complete search history.

(56) References Cited

U.S. PATENT DOCUMENTS

| | | | | |
|---|---|---|---|---|
| 6,964,008 | B1 * | 11/2005 | Van Meter, III | .... G06F 11/1004 714/766 |
| 7,149,789 | B2 * | 12/2006 | Slivka | ....................... G06F 8/61 709/219 |
| 7,150,015 | B2 * | 12/2006 | Pace | ......................... G06F 8/60 717/176 |
| 7,810,091 | B2 * | 10/2010 | Gartside | ................... G06F 8/61 709/203 |

(Continued)

OTHER PUBLICATIONS

Remy Spaan; "Secure updates in automotive systems"—Master Thesis; RadBound University. May 30, 2016.*

*Primary Examiner* — Francisco J Aponte
(74) *Attorney, Agent, or Firm* — Barry Choobin; Patent 360 LLC

(57) ABSTRACT

A method, system and computer program product are envisaged for facilitating encoding 'configuration information' corresponding to a software application, within a filename assigned to the software application. The software application is embodied in a 'computer executable file', while the corresponding 'configuration information' is incorporated into a configuration file. The computer executable file is referenced by a symbolic link, and the symbolic link is assigned a file name. A file path referencing the storage location of the configuration file is created and embedded within the filename. A checksum created on the basis of the filename is also embedded there within. Upon transmission, the symbolic link is accessed by each of the end-point computer devices, which process the symbolic link and access the 'computer executable file' and the 'configuration file' incorporating configuration information relevant to the 'computer executable file'.

11 Claims, 3 Drawing Sheets

(56) References Cited

U.S. PATENT DOCUMENTS

| | | | | |
|---|---|---|---|---|
| 7,873,955 B1* | 1/2011 | Sebes | | G06F 21/566 717/168 |
| 8,185,743 B1* | 5/2012 | Goott | | G06Q 20/3821 705/75 |
| 8,209,680 B1* | 6/2012 | Le | | G06F 9/45558 717/174 |
| 8,620,974 B2* | 12/2013 | Stephenson | | G06F 9/45533 707/825 |
| 8,713,356 B1* | 4/2014 | Chan | | G06F 11/2247 714/6.1 |
| 8,799,662 B2* | 8/2014 | Muzammil | | H04L 9/3247 713/176 |
| 8,881,294 B2* | 11/2014 | Johnson | | G06F 21/64 726/26 |
| 8,930,401 B2* | 1/2015 | French | | G06F 21/6218 707/783 |
| 9,288,059 B2* | 3/2016 | Nix | | H04W 4/70 |
| 9,698,825 B2* | 7/2017 | Weigt | | H03M 13/096 |
| 9,720,669 B2* | 8/2017 | Murray | | G06F 8/658 |
| 10,177,977 B1* | 1/2019 | Avramov | | G06F 8/61 |
| 10,210,172 B1* | 2/2019 | Konig | | H04L 67/06 |
| 10,318,262 B2* | 6/2019 | Basu | | G06F 8/53 |
| 10,318,272 B1* | 6/2019 | Manuilov | | H04L 63/00 |
| 2004/0044999 A1* | 3/2004 | Gibson | | G06F 8/65 717/178 |
| 2005/0149923 A1* | 7/2005 | Lee | | G06F 8/65 717/172 |
| 2006/0048222 A1* | 3/2006 | O'Connor | | G06F 21/575 726/22 |
| 2007/0235517 A1* | 10/2007 | O'Connor | | G06Q 10/06 235/375 |
| 2007/0271552 A1* | 11/2007 | Pulley | | G06F 9/453 717/120 |
| 2010/0048170 A1* | 2/2010 | Jewsbury | | G06F 21/52 455/411 |
| 2011/0145919 A1* | 6/2011 | Whelihan | | G06F 21/57 726/22 |
| 2011/0173607 A1* | 7/2011 | Murphey | | G06F 8/71 718/1 |
| 2012/0011102 A1* | 1/2012 | Borden | | G06F 16/162 707/654 |
| 2012/0066274 A1* | 3/2012 | Stephenson | | G06F 8/65 707/825 |
| 2013/0152047 A1* | 6/2013 | Moorthi | | G06F 11/368 717/124 |
| 2013/0318357 A1* | 11/2013 | Abraham | | G06F 21/57 713/176 |
| 2014/0351516 A1* | 11/2014 | Larimore | | G06F 9/455 711/121 |
| 2016/0283256 A1* | 9/2016 | Standley | | G06F 1/24 |
| 2016/0291940 A1* | 10/2016 | Searle | | H04L 41/082 |
| 2016/0294605 A1* | 10/2016 | Searle | | H04L 41/082 |
| 2016/0294614 A1* | 10/2016 | Searle | | G06F 8/654 |
| 2017/0041349 A1* | 2/2017 | Ylonen | | H04L 63/062 |
| 2017/0115980 A1* | 4/2017 | Bagal | | H04L 67/34 |
| 2017/0262657 A1* | 9/2017 | Salmon-Legagneur | | G06F 21/51 |
| 2018/0088928 A1* | 3/2018 | Smith | | H04L 67/34 |
| 2018/0095973 A1* | 4/2018 | Huang | | G06F 16/1748 |
| 2018/0165080 A1* | 6/2018 | Dimitrov | | G06F 8/60 |
| 2018/0270059 A1* | 9/2018 | Nix | | H04W 4/70 |
| 2019/0079755 A1* | 3/2019 | Jones | | G06F 8/71 |
| 2019/0087166 A1* | 3/2019 | Plache | | G06F 8/61 |
| 2019/0205410 A1* | 7/2019 | Goldberg | | G06F 16/152 |
| 2019/0205424 A1* | 7/2019 | Jubb, IV | | G06F 16/183 |

* cited by examiner

COMPUTER IMPLEMENTED SYSTEM AND METHOD FOR ENCODING CONFIGURATION INFORMATION IN A FILENAME

BACKGROUND

Technical Field

The present disclosure generally relates to computer systems and software installations. Particularly, the present disclosure relates to a method, apparatus and computer program that promote and facilitate installation of software programs based on configuration information embedded into a filename assigned to the respective software program files.

Description of Related Art

Computer networks typically comprise a plurality of interconnected computer devices designed to facilitate data transfer inter-alia. Computer networks, by the virtue of functionalities associated with them, play a vital role in creating and sustaining a digitally interconnected society, reliant on the seamless data connectivity and data transfer facilities envisaged by the computer networks. However, computer networks and the corresponding network components and resources are regularly exposed to (security) risks arising due to unauthorized access, misuse, unauthorized modifications and overuse inter-alia. Therefore, in order to enhance the security of the network components and resources, and indeed the entire computer network, the phenomenon of micro-segmentation was envisaged.

Micro-segmentation was desired to provide a micro-level protection for the network components and resources by dividing the computer network into pre-defined micro-segments and by monitoring and controlling the communications between at least two devices utilizing a particular micro-segment within the computer network. Further, the phenomenon of micro-segmentation also aimed to regulate the network traffic according to certain rules preferably pre-established by a network administrator, and to also entrust the network administrator with a level of control and visibility over the communication exchanged between the network devices/network components.

However, one of the prerequisites to implement micro-segmentation across a computer network, is the installation of a predetermined network security software at all the end-point computer devices of the computer network. Since there is a possibility that all the end-point computer devices of the computer network might not be classified as belonging to the same micro-segment, there always exists a need for configuring each of the end-point computer devices in view of the micro-segment that they belong to.

Typically, configuring each of the end-point computer devices on the basis of the corresponding micro-segment requires that the network security software be maintained as common to all the end-point computer devices, and a configuration file specific to individual end-point computer devices of the computer network be created, so as to configure each of the individual end-point computer devices at least on the basis of the micro-segment to which each of the end-point computer devices belongs. However, this approach necessitates separate transmission of the network security software (which is common to all the end-point computer devices) and the configuration file (which is specific to each of the end-point Computer devices of the computer network) to each of the end-point computer devices. Since the network security software and the configuration file are transmitted in a separated manner, at least two downloads would be required on the part of each of the end-point computer devices one for the network security software which is common for all the end-point computer devices, and another for a configuration file which incorporates configuration information necessary to uniquely configure each of the end-point computer devices based on the segment they belong to.

A second (alternative) approach is to embed the configuration information (necessary to configure the network security software on the end-point computer device) within the network security software instead of creating a separate configuration file, and providing for the network security software to be downloaded in combination with the configuration information onto respective end-point computer devices, via a single download link. While this approach obviates the need for two downloads on the part of the end-point computer device, it also eliminates the convenience of using a common network security software, and causes the network security software designated to be installed at one end-point computer device to be different front the network security software designated to be installed at another end-point computer device, at least on the account of the configuration information embedded therein given the fact that the two end-point computer devices may belong to different micro-segments and necessitate different configurations as far as the installation of the network security software is concerned.

Further, prior to being rendered available for a download, the network security software and any instances thereof are typically subjected to the process of 'code signing' which in turn authenticates the underlying program code by digitally signing the program code and by consequentially confirming the validity of the program code as well as the identity of the author (of the program code). The implementation of the second approach would consequentially result in creation of a plurality of network security software instances, typically equivalent to the number of end-point computer devices, since in the case of the second approach, the network security software designated to be installed at one end-point computer device would be different from the network security software designated to be installed at any another end-point computer device. Since each of the instances (of the network security software are required to be exposed to the process of 'code signing' and digitally signed prior to installation as a consequence (of the code signing procedure), more the number of end-point computer devices, more would be the number of network security software instances that are required to be subjected to 'code signing' and digitally signed. Given the possibility that a computer network may incorporate a large number of end-point computer devices, programming different instances of the network security software for each of the end-point computer devices is always considered a cumbersome and expensive task. Additionally, creation of a large number of network security software instances would also mean that a large number of network security software instances would have to be exposed to the process of 'code signing' which in itself is also a cumbersome task. Further, in case of the second approach, since instances of the network security software are different from one another, multiple binary installation files representative of respective network security software instances would have to be created and compiled at a server designated to manage the installation of network security software (across the computer network and at each of the end-point computer devices).

To summarize, implementation of the second approach typically entails execution of a number of sub-tasks including creating a large number of network security software instances, exposing each of the instances to 'code signing' and digitally signing each of the instances, converting the instances into an equivalent number of binary installation files and compiling each of the binary installation files, with the latter two sub-tasks executed at a (dedicated) server. From the number of sub-tasks associated with the implementation of the second approach, it is apparent that this approach (and the implementation thereof) would entail a substantial amount of operational overheads on the part of the server and would also necessitate availability of substantial amount of computation resources at the server for carrying out each of the tasks associated with the implementation (of the second approach). Given the fact that the second approach necessitated availability of substantial amounts of computational resources, and was hindered by the number of resource intensive sub-tasks required to be executed prior to the installation of the network security software at each of the end-point computer devices, it (the second approach) was rendered infeasible for larger computer networks comprising multitude of end-point computer devices and for computer networks which were short on the availability of computational resources and consequentially necessitated a reduction of operational overheads.

A third (alternative) approach is to maintain the network security software as common to all the end-point computer devices, and store the configuration files corresponding to each of the end-point computer devices in a downloadable format on a server (referred to as host computer hereafter), with the file paths directing to the storage locations of respective configuration files on the host computer being made available to each of the end-point computer devices in an encoded format preferably along with the network security software, thereby enabling the end-point computer devices to access and download the relevant configuration file from the host computer, via the respective encoded file path.

However, one of the disadvantages associated with the third approach is that each of the end-point computer devices would have to access a host computer whose identity is unknown and whose trustfulness has not been undisputedly established. Further, there also exists a likelihood that the end-point computer devices may not be able to trustfully establish the identity of the host computer prior to communicating with the host computer and initiating, the download of the configuration file corresponding to the network security software. Further, implementation of the third approach typically necessitates storing at the host computer the configuration files corresponding to the network security software to be installed at each of the end-point computer devices. In this case, since multiple configuration files are stored at the host computer (given the fact that every network security software instance needs to be programmed/configured differently from another, based on the characteristics of the corresponding end-point computer device), the host computer would also have to store, firstly the additional information necessary for trustfully identifying each of the end-point computer devices, and secondly the 'distribution logic' to ensure that every end-point computer device receives a configuration file specifically customized to be initialize the network security software in-line with the operational requirements of that particular end-point computer device.

Further, the host computer would also have to undertake the task of identifying each of the end-point computer devices requesting a configuration file and further identifying configuration files relevant to respective end-point computer devices. The requirement for the additional information—necessary for identifying each of the end-point computer devices—to be stored at the host computer, and the requirement on the part of the host computer to trustfully identify each of the end-point computer devices and further associate (map) each of the configuration files with respective end-point computer devices, prior to transmitting the configuration files to respective end-point computer devices, imposes additional operational overheads on the host computer and also causes the host computer to be bogged down by the enormity of identifying each of the end-point computer devices in a computer network and mapping each configuration file to a corresponding end-point computer device prior to transmitting the mapped configuration files to the respective end-point computer devices. It is also pertinent to note that the operational overheads imposed on the host computer increase exponentially with an increase in the number of end-point computer devices, thereby rendering the third approach also infeasible for larger computer networks comprising multitude of end-point computer devices and for computer networks which were short on the availability of computational resources and therefore necessitated a reduction of operational overheads.

It is pertinent to note that all the three aforementioned approaches facilitating micro-segmentation of a computer network entail downloading on to the end-point computer devices, the network security software and the configuration file, either in the form of a combined computer program file or as disparate computer program files. The drawbacks described to be associated with the said three approaches not only highlight the cumbersome procedures and operational overheads associated with the implementation of the three approaches but also shift the emphasis towards promoting seamless, at least near-simultaneous download and consequential installation of network security software on all the end-point computer devices of a computer network, irrespective of the number of end-point computer devices present on the computer network. Accordingly, there has been felt a need for a framework and a corresponding apparatus and method that would not only help overcome the deficiencies described to be associated with the three approaches (described earlier), but also facilitate seamless download and consequential installation of network security software in a near-simultaneous manner on all the end-point computer devices of a computer network, irrespective of the number of end-point computer devices. Further, there has been felt a need for a framework and a corresponding apparatus and method that would facilitate one-click installation of the network security software on a corresponding end-point computer device, and effortlessly replicate the one-click installation phenomenon across a multitude of end-point computer devices. There has also been felt a need for a framework and a corresponding apparatus and method that would facilitate large scale download and near-simultaneous installation of software programs on a multitude of end-point computer devices, without inflicting substantial operational overheads (on the part of servers/hosts managing the download and installation of said software programs) and without necessitating availability of substantial amount of computer based resources for facilitating such large scale download and near-simultaneous installation.

OBJECTS

An object of the present disclosure is to promote ease of use in terms of downloading and installing a software from a host computer on to end-point computer devices.

Yet another object of the present disclosure is to facilitate one-click, zero-touch and one-link based download and installation of a software program from a host computer onto multiple end-point computer devices.

Still a further object of the present disclosure is to provide a robust, trustful, safe framework that provides for the configuration information to be shared with the end-point computer devices in a tamper proof, secured manner.

One more object of the present disclosure is to obviate the use of interactive mode during the download and installation of a software from a host computer onto multiple end-point computer devices.

Yet another object of the present disclosure is to envisage a framework and a corresponding apparatus and method that reduce the probability of end-point computer devices being redirected to memory locations storing malicious software codes/programs, by the way of directing the end-point computer devices to a trustful server/host computer identifiable via a verified file path, for facilitating download and installation of a software program.

Still a further object of the present disclosure is to envisage a framework and a corresponding apparatus and method that provide for early and efficient detection of any wrongful manipulation of the configuration information being shared with the end-point computer devices.

One more object of the present disclosure is to obviate the necessity to create multiple installation files and facilitate re-use of a single installation file across multiple end-point computer devices, post dynamic customization of the installation file basis the requirements of the individual end-point computer devices.

Yet another object of the present disclosure to prevent provisioning of a software and a corresponding configuration information as two separate downloadable files by the way of embedding the relevant configuration information into a filename of the software.

One more object of the present disclosure is to render one instance of software suitable for deployment across a plurality of end-point computer devices, by facilitating embedding the relevant configuration information on to the filename of the software and providing for the filename to be manipulated dynamically prior to the deployment at the end-point computer devices.

Still a further object of the present discourse is to facilitate embedding of a checksum within the filename of the software, so as to detect any wrongful manipulation of the filename of the software prior to the deployment at the end-point computer devices.

SUMMARY

The present disclosure envisages a computer implemented method and a corresponding computer implemented system and a computer program product that facilitate encoding configuration information corresponding to a software application in a filename. For the sake of explanation, a software program/software application (referred to as 'software' hereafter) which is required to be installed in a plurality of end-point computer devices is embodied in a 'computer executable file'. The 'computer executable file' is preferably stored in a remote, centralized host computer which is in turn communicably coupled to each of the plurality of end-point computer devices. Subsequently, at least one symbolic link referencing the computer executable file is created by the host computer. The symbolic link is also assigned a filename, as was the case with the 'computer, executable file'. Preferably, instead of the 'computer executable file' embodying the software, the symbolic link referencing the 'computer executable file' is shared with each of the end-point computer devices, and the 'computer executable file' remains securely stored on the host computer. Alternatively, the host computer could create at least one instance of the 'computer executable file' embodying the software program and assign a filename to the instance of the 'computer executable file'. In this case, the instance(s) of the 'computer executable file' are shared with each of the end-point computer devices, for subsequent installation and execution.

Further, it is imperative that any software program downloaded and installed onto each of the end-point computer devices is initialized and executed in a controlled manner. Preferably, initialization of an installed software program is performed on the basis of the 'configuration information' associated with the software program. Essentially, the 'configuration information' corresponding to the software program includes information including but not restricted to the 'model name and type', 'operating system type'—which helps classify the first computer executable file as relevant to specific operating systems, 'tenant name' indicative of the customer for which the computer executable file' has been created and/or customized, any necessary source file information, support file information, language specific help file information, Graphical User Interface (GUI) related information, module name, version number, time of creation, languages the software program supports, and the like. The 'configuration information' also includes any 'initial parameters' that may be necessary for the execution of the software program subsequent to the installation. Preferably, at least some of the elements constituting the 'configuration inhumation', and especially some of the initial parameters could vary from one end-point computer device to another. In cases where the end-point computer devices are known to be incorporating diversifying requirements in terms of installing and executing the software program, the host computer maintains several copies of the 'configuration information'—preferably in the form of either a binary configuration file or a text-based configuration file—with each copy of the 'configuration information' and in turn the 'configuration file' being customized to be used on a specific end-point computer device.

As specified above, the configuration information' corresponding to the software program embodied in the 'computer executable file' is incorporated into the 'configuration file', and the configuration file is stored in a predesignated memory location of a memory module communicably coupled to or installed within the host computer. The host computer is configured to determine a file path that when activated directs to the storage location of the configuration file which in turn holds the 'configuration information' necessary for initializing instances of the software on each of the end-point computer devices. The file path representing the storage location of the configuration file preferably forms the 'metadata' corresponding to the configuration file. It is the metadata corresponding to the configuration file that is embedded into the filename assigned to the symbolic link, prior to sharing the said symbolic link with each of the end-point computer devices.

Therefore, essentially the symbolic link points to a memory location on the host computer storing the 'computer executable file', and also facilitates download of the 'computer executable file' from the said memory location, while the filename assigned to the symbolic link, which is embedded with the file path, provides for the download of the 'configuration information' necessary for initialization of the software program embodied in the 'computer executable file', on each of the end-point computer devices.

Preferably, a checksum, which is created on the basis of the filename assigned to the symbolic link is incorporated therein, i.e. into the filename assigned to the symbolic link, thereby rendering the filename assigned to the symbolic link as a combination of the metadata and the checksum. Preferably, the checksum acts as a benchmark using which any tampering of the symbolic link and any consequential compromise in the integrity of the checksum is detected.

Further, when the symbolic link is transmitted to each of the end-point computer devices, respective computer devices process the symbolic link and access the 'computer executable file' and the configuration file incorporating configuration information relevant to the computer executable file. While the symbolic link itself renders the computer executable file accessible and downloadable, the filename assigned to the symbolic link renders the configuration file incorporating the configuration information accessible and downloadable via the file path embedded therein (i.e. within the filename assigned to the symbolic link).

BRIEF DESCRIPTION OF THE ACCOMPANYING DRAWINGS

The present disclosure will be better understood from the following detailed description, with reference to the accompanying drawings, in which.

Figure 2A:
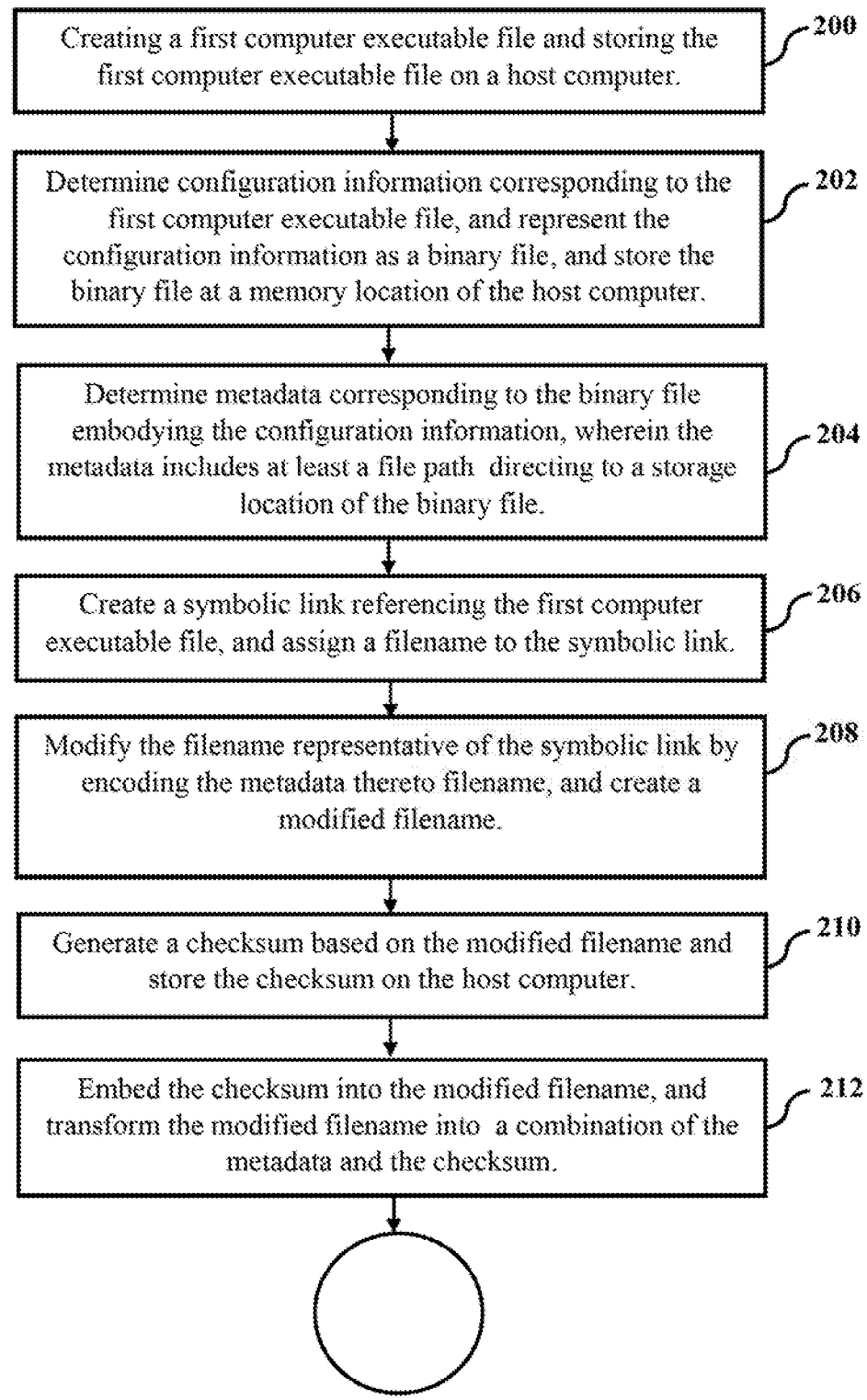
Figure 2B:
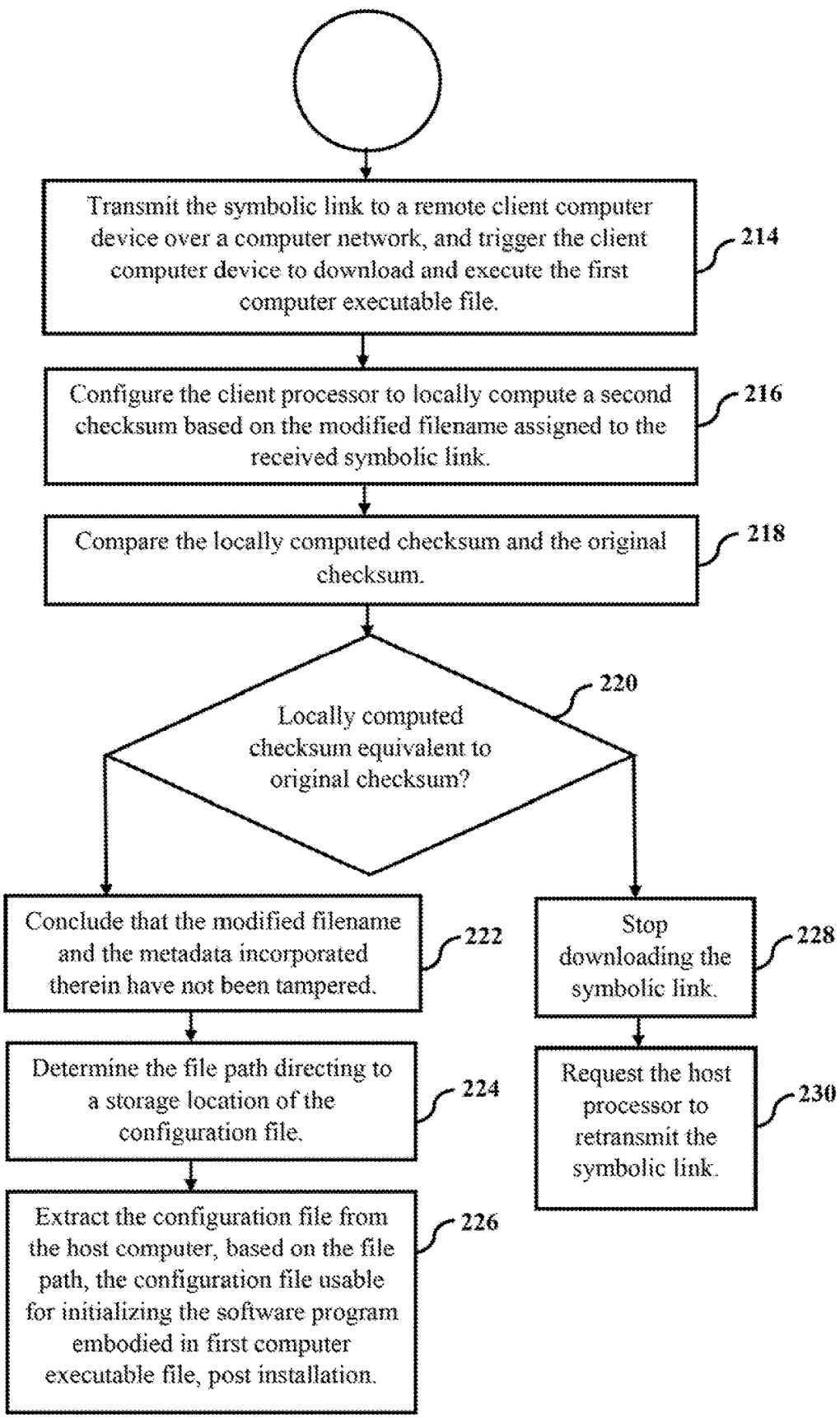

FIGS. 2A and 2B in combination illustrate a flow-diagram describing the steps involved in the computer implemented method for facilitating encoding of configuration information in a file name of a computer executable file, in accordance with the preferred embodiment of the present disclosure.

DETAILED DESCRIPTION

It is pertinent to note that while the features envisaged by the present disclosure have been explained using the example of a network security software, those skilled in the art would readily appreciate the possibility of the system, method and computer program product of the present disclosure being implemented using any software program irrespective of its type, nature and purpose.

As described in the foregoing sections, implementation of micro-segmentation in a computer network necessitates it of predetermined network security software on all the predesignated end-point computer devices of the computer network. Considering the fact that a typical computer network incorporates multitude of end-point computer devices, installing network security software on each of those end-point computer devices is likely to qualify as a huge-scale installation. Three possible approaches for facilitating large-scale installation of network security software were discussed hitherto, with the first approach envisaging transmitting the network security software and the corresponding configuration file to each of the end-point computer devices for download. The second approach includes embedding the configuration information relevant to each of the end-point computer devices in respective instances of the network security software and transmitting the instances of network security software to respective end-point computer devices. The third approach entailed storing the configuration information pertinent to each of the end-point computer devices on a host computer and transmitting the file path address of the host computer to each of the end-point computer devices preferably along with the network security software and prompting each of the end-point computer devices to access the host computer and download the respective configuration information therefrom.

However, implementation of either of the three approaches entailed certain drawbacks including the necessity on the part of the end-point computer devices two initiate two download operations, one for the network security software and the other for the configuration information; the necessity on the part of a network administrator to create binary information files for every instance of the network security software, since it is probable that the configuration information embedded in every instance of the network security software is different; and the necessity on the part of each of the end-point computer device to access the remote host computer for the necessary configuration information, strictly prior to downloading the network security software.

In order to address the drawbacks associated with the three approaches for large-scale installation of network security software, the embodiments discussed herein envisage creating a computer executable file embodying the network security software and encoding the configuration information corresponding to the network security software, onto the filename of the computer executable file. Since the configuration information relevant to each of the end-point computer devices is encoded into the filename of the computer readable file incorporating the network security software, the end-point computer devices would no longer be required to initiate two separate downloads, one for the network security software and the other for the relevant configuration information. Secondly, multiple instances of the network security software would not be required since the configuration information which is likely to vary from end-point computer device to end-point computer device is encoded with the filename assigned to the network security software, while the structure of the network security software is kept unchanged. Further, since the configuration information which is likely to vary from end-point computer device to end-point computer device is encoded with the filename assigned to the computer executable file embodying the network security software, there would never arise a need to create multiple instances of network security software in order to account for the variations/differences in the configuration information from one end-point computer device to another end-point computer device.

Figure 1A:
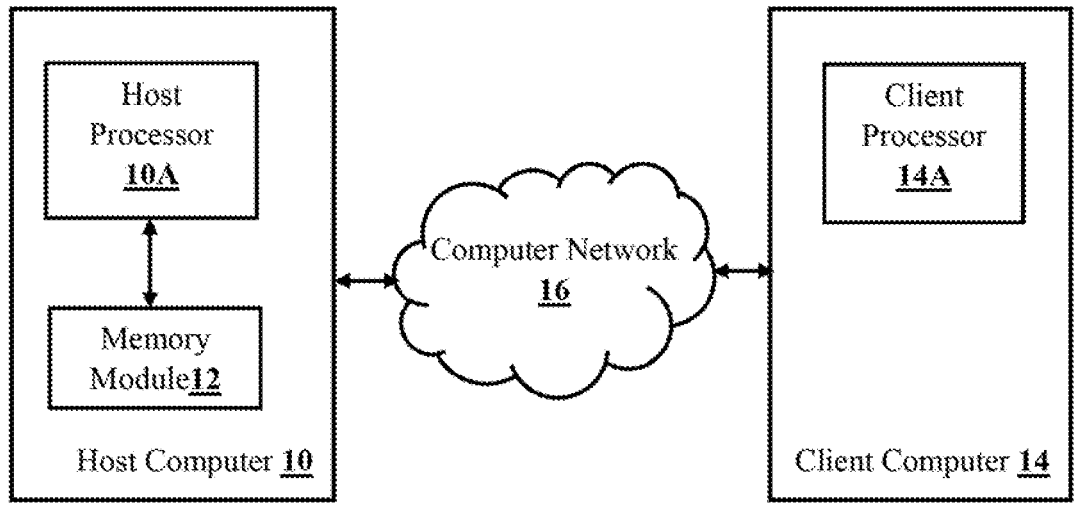
FIG. 1A is a block diagram illustrating the constituents of a computer implemented system that facilitates encoding of configuration information in a file name of a computer executable file, in accordance with a preferred embodiment of the present disclosure.

Referring now to the drawings, FIG. 1A is a block diagram describing a host processor 10A configured to facilitate encoding of configuration information into a filename assigned to a computer executable file. The host processor 10A is preferably installed within a host computer 10. The host processor 10A is functionally coupled to a memory module 12 which is either installed within the host computer 10 or is at least functionally coupled to the server computer 10 via a bus (not shown in figures). The host processor 10A is configured to create a 'first computer executable file' (not shown in figures) and structure the filename of the 'first computer executable file' as FILENAME$_1$.EXT$_1$. For the purpose of exemplification, the filename assigned to the 'first computer executable file' is referred to as 'first filename', The 'first computer executable file' is preferably an executable file which incorporates an exemplary 'network security software' programmed to execute a network security policy on an end-point computer device denoted by reference numeral 14 (referred to as client computer device hereafter), post download and installation (of the network security software) thereon. The 'first computer executable file' incorporating the network security software is preferably stored on a predetermined memory location of the memory module 12 which in turn has either been installed within the host computer 10 or functionally coupled to the host computer 10 via a bus.

It is pertinent to note that the phenomenon of the 'first computer executable file' incorporating a network security software is only exemplary in nature and therefore should not be construed in a limiting sense. Those reasonably skilled in the art would be able to appreciate the fact the first computer executable file could include any type of software program or any type of information and data capable of being processed by a computer. For instance, instead of the network security software, the 'first computer executable file' could incorporate a device driver or a multimedia software or a word processing software and the like. However, for the sake of explaining the features of the preferred embodiment of the present disclosure, the 'first computer executable file' is described as incorporating a network security software, and at least some of the portions of the present disclosure have been detailed considering the network security software as a reference, while acknowledging the fact that the 'first computer executable file' could be programmed to incorporate other different types of information/data and software programs.

In accordance with the preferred embodiment of the present disclosure, the 'first computer executable file' created by the host processor 10A is an executable program file that incorporates computer program code necessary to install and implement the network security software. Additionally, it is also possible that a program code corresponding to a proprietary checksum generator and a corresponding proprietary checksum verification logic are also embodied into the 'first computer executable file', in addition to incorporating a set of default configuration parameters usable in initializing at least the basic functionalities of the network security software, therein.

As discussed in subsequent paragraphs, the program code corresponding to the proprietary checksum generator may facilitate installation of the proprietary checksum generator on a client computer device 14 subsequent to the client computer device 14 downloading the 'first computer executable file', and the set of default configuration parameters are used to initialize the network security software installed on the client computer device 14 with default values, in case of non-availability of a 'configuration file' embodying configuration parameters customized in-line with the functional requirements of client computer device 14.

Further, the 'first computer executable file' is digitally signed, preferably via implementation of the process of 'code signing', which in turn authenticates the underlying program code by digitally signing the program code and by consequentially confirming the validity of the program code, and the identity of the author (of the program code). Preferably, the 'code signing' procedure is executed and the digital signature is created using any of the well-known digital signature standards including but not restricted to Elliptic Curve Digital Signature Algorithm (ECDSA), RSA algorithm, and Edwards-curve Digital Signature algorithm.

Further, in accordance with the preferred embodiment of the present disclosure, the 'first computer executable file' is associated with 'configuration information' which inter-alia initializes the network security software incorporated in the 'first computer executable file' post installation thereof on the client computer device 14, and also controls, at least in-part, the execution of the network security software on the client computer device 14.

In accordance with the preferred embodiment of the present disclosure, 'configuration information' is a term that represents parameters necessary to configure the network security software embodied within the first computer executable file, on the client computer device 14. The 'configuration information' is also necessary to control the execution of the network security software on the client computer device 14, and also to manipulate and track the implementation of the network security software on the client computer device 14. As discussed earlier, the 'configuration information' corresponding to the 'first computer executable file' is embodied either in a binary file or in a text-based file (referred to as configuration file hereafter), which in turn is stored in the memory module 12. Preferably, the 'configuration information' corresponding to the 'first computer executable file' includes information such as model type, model name and operating system type—which help classify the first computer executable file as relevant to specific operating systems. The 'configuration information' also includes information indicative of the customer for which the 'first computer executable file' has been created and/or customized. Further, the 'configuration information' may also include any necessary source file information, support file information, language specific help file information, Graphical User Interface (GUI) related information, module name, version number, time of creation, languages the 'the computer program code embodied in the first computer executable file' supports, and the like. The host processor 10A is configured to store the configuration file embodying the 'configuration information' corresponding to the first computer executable file, on a pre-determined memory location (not shown in figures) of the memory module 12. Subsequently, the host processor 10A creates a 'file path' pointing to the storage location of the configuration file.

In accordance with the preferred embodiment of the present disclosure, the configuration file incorporating the configuration information corresponding to the 'first computer executable file' the 'configuration information' which is necessary for initialization and controlled execution of the network security software incorporated on the 'first computer executable file' on the client computer device 14 is stored on predetermined memory location of the memory module 12, and the memory location storing the configuration file is identified and rendered accessible using the file path created by the host processor 10A. In this case, the file path pointing to the storage location (memory location) of the configuration file is considered as the 'metadata' pertaining to the configuration file. Preferably, the information about the file path, forming the metadata corresponding to the configuration file, is used to identify the storage location of the configuration file, and to access and download the configuration file from the storage location.

In accordance with the preferred embodiment of the present disclosure, the host processor 10A further creates a symbolic link referencing the 'first computer executable file' and assigns a filename to the thus created symbolic link. In an exemplary embodiment of the present disclosure, if the filename of the 'first computer executable file' is structured as 'FILENAME$_1$.EXT$_1$', the symbolic link referencing the 'first computer executable file' is structured as 'FILENAME$_2$.EXT$_2$'. As known in the art, the symbolic link, instead of representing a file/directory, provides a path descriptor which upon activation (execution) leads to the memory location storing the file/directory. In this case, the symbolic link bearing the exemplary filename 'FILENAME$_2$.EXT$_2$', when accessed preferably by a client processor 14A installed with a client computer device 14, provides for the extraction of the referenced address which is the (memory location) address where the 'first computer executable file' having the exemplary filename 'FILENAME$_1$.EXT$_1$' is stored. Subsequently, based on the symbolic link, the 'first computer executable file' is accessed by the client processor 14A and the exemplary network security software embodied within 'first computer executable file' is extracted and in stalled on the client computer device 14.

In accordance with the preferred embodiment of the present disclosure, subsequent to creating the symbolic link referencing the 'first computer executable file' and structuring the filename representative of the symbolic link as FILENAME$_2$.EXT$_2$, the host processor 10A further modifies the filename assigned to the symbolic link. The host processor 10A incorporates the metadata relevant to the configuration file, into the filename assigned to the symbolic link. In this case, while the configuration file embodies the 'configuration information' corresponding to the 'first computer executable file', the metadata corresponds to the file path referencing the storage location of the configuration file. With the inclusion (preferably by the way of encoding) of the metadata corresponding to the configuration file, onto the filename of the symbolic link, the filename of the symbolic link which was earlier in the format FILENAME$_2$.EXT$_2$ is restructured as FILENAME$_2$_METADATA.EXT$_2$ thereby signifying the inclusion of the metadata thereto. The filename assigned to the symbolic link, i.e. FILENAME$_2$_METADATA.EXT$_2$ is also referred to as 'modified filename' for the sake of explanation.

Preferably, the metadata corresponding to the configuration file is encoded into the filename assigned to the symbolic link, using base64 algorithm, and the string FILENAME$_2$_METADATA.EXT$_2$ which is the filename assigned to the symbolic link is converted into a base64 string subsequent to the implementation of the base64 algorithm. Since the base64 algorithm is well-known in the art, a detailed discussion of the said algorithm is omitted for the sake of brevity.

In accordance with the preferred embodiment of the present disclosure, the 'first computer executable file' embodying the exemplary network security software is stored on the host computer 10—preferably on the memory module 12 of the host computer 10, and only the symbolic link referencing the 'first computer executable file' is shared with a plurality of client computer devices (FIG. 1 showing a sole client computer device 14 for the sake of brevity), thereby facilitating large-scale simultaneous installation of the exemplary network security software across multiple client computer devices. Further, it is also likely that the (version of the) network security software required to be installed on all of the client computer devices remains the same, while the configuration information necessary to initialize the network security software on each of the client computer devices varies from client computer device to client computer device, given the fact that each of the client computer devices accessing the host computer 10 for downloading the network security software ('first computer executable file') mays belong to different tenants and therefore may have varying functional requirements.

By storing the 'configuration information' relevant to the 'first computer executable file' in the form of a 'configuration file' on the host computer; by maintaining the 'first computer executable file' and the configuration file as disparate program files; and by embedding the file path directing to the storage location of the configuration file into the filename associated with the symbolic link, the present disclosure ensures that in case if certain client computer devices necessitate different versions/types of 'configuration information' owing to the fact that the said client computer devices belong to different tenants having user requirements different from one another, then it is only the configuration file incorporating the 'configuration information' that requires to be modified in-line with the changing user requirements, and not the entire 'first computer executable program' embodying the exemplary network security software.

Further, since the configuration file is stored on the host computer, and a file path directing to the configuration file is embedded within the filename assigned to the symbolic link, prior to sharing the said symbolic link with each of the client computer devices, if there arises a need to share different types/versions of the 'configuration information' with certain client computer devices, only the 'configuration file' incorporating the 'configuration information' could be manipulated, followed by storing the different versions/different types of configuration information on respective configuration files—which are essentially different with respect to one another—which would in turn be stored on different memory locations, of the host computer 10. Subsequently, each of the different 'configuration files' are accorded different file paths and the different file paths are embedded into respective instances of the symbolic link and transmitted to respective client computer devices, One of the major advantages envisaged herein is that in case of a change in the 'configuration information', it is only the configuration file and the file path that need to be modified before being embedded into the filename of the symbolic link, but not the symbolic link itself and the 'first computer executable file' referenced by the symbolic link.

In accordance with the preferred embodiment of the present disclosure, the filename assigned the symbolic link is yet again modified in order to incorporate a checksum therein. The checksum is an addition to the metadata (file path) previously encoded/incorporated into the filename. While the file path encoded into the filename (assigned to the symbolic link) points to the storage location of the configuration file deemed necessary for initializing the network security software installed from the 'first computer executable file', the checksum helps in verifying the integrity of the filename assigned to the symbolic link (file), by allowing the client processor 14A to determine whether or not the filename assigned to the symbolic link and consequentially the metadata—directing the client processor to the storage location of the 'configuration file'—embedded within the filename has been corrupted or wrongfully manipulated.

Preferably, the host processor 10A calculates a checksum based on the filename assigned to the symbolic link. Preferably, the checksum generator—used by the host processor to calculate the checksum—is a proprietary software module installed within the host computer 10, which considers the filename assigned to the symbolic link as an input and generates a checksum based on the said filename. The checksum generator also embeds the checksum generated on the basis of the filename of the symbolic link, into the filename of the symbolic link. Since the process of generating a checksum is well-known in the art, any further explanation in this regard is omitted for the sake of brevity. Further, for the sake of explanation and easy reference, the checksum generated by the host processor 10A as explained above is referred to as 'original checksum' hereafter. Subsequent to the addition of the checksum into the filename of the symbolic link, the filename is transformed into a combination of the metadata (the metadata being a file path pointing to the memory location storing the configuration file which in turn incorporates the 'configuration information' necessary to initialize the network security software embodied in the 'first computer executable file', on the client computer device 14) and the checksum.

As discussed above, the filename assigned to the symbolic link, i.e. the filename structured as $FILENAME_2.EXT_2$ is restructured by the inclusion of metadata thereto as $FILENAME_2\_METADATA.EXT_2$. The 'metadata' as discussed above is the 'file path' pointing to the storage location (on the tummy module 12) of the configuration file embodying 'configuration information' corresponding to the 'first computer executable file', the 'first computer executable file' embodying the network security software to be downloaded and installed onto the client computer device 14. The host processor 10A calculates the checksum on the basis of at least the filename—$FILENAME_2\_METADATA.EXT_2$—assigned to the symbolic link. As discussed above, the checksum generator is a proprietary software module installed within the host computer 10 and accessible to the host processor 10A. Alternatively, instead of the proprietary checksum generator, any of the well-known checksum calculation algorithms including the Cyclic Redundancy Check (CRC) and the File Checksum Integrity Verifier (FCIV) could be implemented by the host processor 10A to generate the checksum based on the filename assigned to the symbolic link.

Subsequently, by the inclusion of the checksum, the filename assigned to the symbolic link is again restructured as $FILENAME_2\_METADATA\_CHECKSUM.EXT_2$. In addition to being embedded with the filename (assigned to the symbolic link), the checksum is also optionally stored into the memory module 12 of the host computer 10. Preferably, the checksum embedded into the filename assigned to the symbolic link would not be known outside the host computer 10. Even when the filename assigned to the symbolic link is restructured as $FILENAME_2\_METADATA\_CHECKSUM.EXT_2$ with the inclusion of the checksum thereto, the checksum appended to the metadata is hidden from being displayed and also hidden from the view of any user of the client computer device 14. Since the checksum, despite its inclusion in the filename assigned to the symbolic link, is prevented from being displayed and viewed, it is apparent that a hacker attempting to manipulate the filename assigned to the symbolic link, would be unable to neither appreciate the presence of the checksum nor effectively duplicate the checksum. Preferably, the filename of the symbolic link, which, post the inclusion of 'metadata' and the 'checksum' is in the format $FILENAME_2\_METADATA\_CHECKSUM.EXT_2$, is processed by a base64 algorithm prior to the transmission of the symbolic link to the client computer 10—and is consequentially represented as a base64 string.

In accordance with the preferred embodiment of the present disclosure, the checksum is incorporated into the filename of the symbolic link, so as to detect any wrongful and unlawful tampering of the filename assigned to the symbolic link (the filename as discussed earlier incorporating metadata pointing to the storage location of the 'configuration file' necessary for initializing the network security software constituted in the 'first computer executable file' post an installation on the client computer device 14), preferably when the symbolic link was in transit to the client computer 10 across the computer network 16, and prior to the symbolic link being received and downloaded by the client computer device 14. Since the checksum incorporated into the filename was calculated on the basis of the filename of the symbolic link, any tampering of the filename assigned to the symbolic link would also have an impact on the structure checksum associated with the filename, causing any checksum (original checksum) locally calculated based on the tampered/manipulated filename to be different than the checksum calculated and embedded into the filename by the host processor 10A.

Further, it is also apparent that any manipulation of the filename of the symbolic link is most likely to be wrongful and malicious in nature. Typically, the file path which would have originally led the user of the client computer device 14 to a memory location on the memory module 12 (of the trusted host computer 10) storing the configuration file, is tampered with the intention of leading the unsuspecting user probably to another memory location which is different from the memory location intended to be accessed by the user for downloading the configuration file necessary for initializing the network security software. Typically, any other memory locations that the user of the client computer device 14 might be deceitfully led into, might be hosting a malware programmed to compromise the functioning of the client computer device 14.

Therefore, to enhance the security associated with the filename assigned to the symbolic link, and in order to provide a dependable option for the client processor 14A to verify the integrity of the downloaded symbolic link (file), and to also trigger a warning directed to the client processor 14A highlighting a possible unlawful tampering/manipulation of the filename assigned to the symbolic link, the checksum is combined with the metadata embedded into the filename of the symbolic link, prior to the transmission of the symbolic link to the client computer device 14.

As discussed earlier, the symbolic link referencing the 'first' computer executable is assigned the filename $FILENAME_2\_METADATA\_CHECKSUM.EXT_2$. The filename assigned to the symbolic link incorporates the 'metadata' and the 'checksum' as discussed in the aforementioned paragraphs. Further, the symbolic link is transmitted from the host computer 10 to the client computer device 14 via the computer network 16. In the event that the filename assigned to the symbolic link is wrongfully manipulated while in transit and a priori to the symbolic link being downloaded by the client processor 14A, then the checksum (incorporated into the filename assigned to the symbolic link) is used to detect such a wrongful manipulation, and the consequential loss of the integrity of the filename of the symbolic link.

In accordance with the preferred embodiment of the present disclosure, the client processor 14A installed within the client computer device 14 receives the symbolic link from the host computer 10 and subsequently proceeds to analyze the symbolic link and the filename assigned to the symbolic link. The process of analysis begins with the client processor 14A accessing the storage location (on the memory module 12) referenced by the symbolic link and initiating a download of the 'first computer executable file' that incorporates inter-alia the exemplary network-security software. Subsequently, the client processor 14A executes the downloaded 'first computer executable file' and consequentially the software program code embodied therein to trigger and facilitate installation of the corresponding network-security software on the client computer device 14. With the installation of the network-security software on the client computer deice 14 being complete, the client processor 14A analyses the filename assigned to the symbolic link file, so as to decode and analyze the metadata referencing the storage location of the 'configuration file' necessary for initializing the network-security software on the client computer 14, post the installation. Preferably, the client processor 14A decodes the filename assigned to the symbolic link using the base64 algorithm and deciphers the 'metadata' (referencing the storage location of the 'configuration file') and the 'checksum' computed and embedded into the filename by the host processor 10A a priori to the transmission of the symbolic link file onto the client computer 14.

During the analysis of the filename assigned to the symbolic link, the client processor 14A validates/verifies the integrity of the filename, so as to ensure that the filename assigned to the symbolic link is not corrupted/wrongfully manipulated while in transit via the computer network 16 and a priori to the symbolic link being downloaded onto the client computer 14.

Typically, in order to validate the integrity of the checksum previously calculated (original checksum) and embedded into the filename of the symbolic link by the host processor 10A, the client processor 14A should locally (re)calculate the checksum and compare the locally (re)calculated checksum with the original checksum. Ideally, to locally (re)calculate the checksum, the client processor 14A should use the same proprietary checksum generator and the same information (i.e. filename assigned to the symbolic link) which were used earlier by the host processor 10A to calculate the original checksum, in order to obviate any chances of the original checksum being different than the locally computed checksum, not on the account of loss of integrity of the filename assigned to the symbolic link, but on account of different intrinsic functional characteristics associated with the different checksum generators used by the host processor 10A and the client processor 14A. In view of the aforementioned requirement, it is preferable that the (same) proprietary checksum generator and the corresponding proprietary checksum verification logic are rendered accessible to the client processor 14A as well, at least during the verification of the integrity of the filename assigned to the symbolic link. Preferably, the proprietary checksum generator and the corresponding proprietary checksum verification logic are incorporated into the 'first computer executable file' by the host processor 10A, preferably a priori to the creation of the symbolic link referencing the storage location of the 'first computer executable file', and a priori to the symbolic link being transmitted to the client computer device 14.

Consequentially, when the client processor 14A analyses the symbolic link and downloads the 'first computer executable file' referenced by the symbolic link, onto the client computer 14, the client processor 14A is provided with access to the proprietary checksum generator and the corresponding proprietary checksum verification logic embodied within the 'first computer executable file'. Further, with the client processor 14A receiving the symbolic link, the filename assigned to the symbolic link is also made known to the client processor 14A; the filename assigned to the symbolic link being previously used as an input by the host processor 10A to facilitate calculation of the original checksum. In this manner, the client processor 14A is provided with access to the same proprietary checksum, generator as well as the same set of input information (i.e. the filename assigned to the symbolic link), which were used previously in combination by the host processor 10A to calculate the original checksum.

Accordingly, the client processor 14A uses the same checksum generator, and the same set of input information (i.e. the filename assigned to the symbolic link) to locally compute a checksum (referred to as 'locally computed checksum' hereafter). Typically, since both the host processor 10A and the client processor 14A use the same proprietary checksum calculator and the same set of input information (i.e. the filename of the symbolic link) as the basis for calculating the 'original checksum' and the locally computed checksum' respectively, both the checksums should turn out to be equivalent, unless the symbolic link has been wrongfully manipulated or corrupted, while in transit to the client computer 14 and a priori to the symbolic link being downloaded by the client processor 14A.

Post a comparison between the 'original checksum' and the 'locally computed checksum', if the locally computed checksum turns out to be equivalent to the original checksum, then the client processor 14A determines that the symbolic link which had been transmitted from the host processor 10A is equivalent to the symbolic link downloaded by the client processor 14A, and that the filename assigned thereto has not been tampered. Alternatively, post comparison, if the locally computed checksum turns out to be different than the original checksum, then the client processor 14A concludes that the symbolic link has been tampered in transit and prior to the download thereof onto the client computer 14.

In accordance with the preferred embodiment of the present disclosure, if the client processor 14A determines that the locally computed checksum is equivalent to the checksum originally calculated and embedded into the filename of the symbolic link by the host processor 10A (original checksum), then the client processor 14A determines the storage location of the 'configuration file' based on the analysis of the 'metadata' embedded within the filename assigned to the symbolic link, and subsequently proceeds with downloading the 'configuration file' onto the client computer device 14 and initializing the network security software installed therein, on the basis of the 'configuration information' incorporated within the 'configuration file'.

Alternatively, if the locally computed checksum is found to be different than the original checksum, then the client processor 14A concludes that the filename of the symbolic link has been wrongfully manipulated or corrupted, and accordingly foregoes downloading the 'configuration file' embodying configuration information necessary for initializing the network security software installed on the client computer device 14) from the storage location on the memory module 12 referenced by the 'metadata' embedded within the filename assigned to the symbolic link. Consequentially, the client processor 14A also aborts the initialization of the (installed) network security software owing to the fact that the corresponding 'configuration file' necessary for the initialization has either been corrupted or wrongfully manipulated. While the preferred embodiment of the present disclosure describes the client processor 14A as aborting the download of the 'configuration file' subsequent to determining that the integrity of the filename assigned to the symbolic link has been corrupted/wrongfully manipulated, it is also possible that the client processor 14A in addition to aborting the download of the 'configuration file' from the memory module 12, selects to initialize the network security software installed on the client computer device 14, using 'default configuration parameters' preferably extracted from the 'first computer executable file' downloaded onto the client computer 14.

While the preferred embodiment of the present disclosure describes creating a symbolic link referencing the 'first computer executable file', it is also possible that the host processor 10A creates at least one 'instance' (copy) of the 'first computer executable file' embodying the network security software, instead of creating the symbolic link. In the event that an instance of the 'first computer executable file' is created instead of the symbolic link, the said 'instance' of the 'first computer executable file' (referred to as instance hereafter) is assigned the filename $FILENAME_2.EXT_2$. It is pertinent to note that, in this case, while the 'first computer executable file' embodying the network security software is assigned the name $FILENAME_1.EXT_1$, the 'instance' of the 'first computer executable file' may be assigned the name $FILENAME_2.EXT_2$.

In such a case, the filename ($FILENAME_2.EXT_2$) assigned to the 'instance' is restructured by the host processor 10A to incorporate therein the metadata relevant to the corresponding configuration file—the configuration file which in turn embodies the 'configuration information' necessary for initializing the network security software incorporated within 'first computer executable file', post the installation on the client computer device 14. With the inclusion of the metadata (i.e. file path) corresponding to the configuration file onto the filename of the instance, the filename of the instance which was in the format $FILENAME_2.EXT_2$ is modified to $FILENAME_2\_METADATA.EXT_2$ thereby denoting the inclusion of the metadata. Further, the host processor 10A calculates a checksum based on the filename ($FILENAME_2\_METADATA.EXT_2$) assigned to the instance. The checksum generator described earlier as being installed within the host computer 10 is utilized to calculate the checksum, considering the filename assigned to the instance as an input. The checksum thus created is also encoded into the filename of the instance, thereby restructuring the filename of the instance from $FILENAME_2\_METADATA.EXT_2$ to $FILENAME_2\_METADATA\_CHECKSUM.EXT_2$.

Further, since the manner in which the 'instance' is analysed, downloaded and executed by the client processor 14A is exactly similar to the manner in which the client processor 14A would have analysed, downloaded and executed the symbolic link as described in the preferred embodiment of the present disclosure), and since the steps/procedures implemented by the client processor 14A subsequent to downloading and executing the instance are exactly similar to the manner in which the client processor 14A would have downloaded and executed the symbolic link, such details (steps/procedures) about how the instance is analysed, downloaded and executed by the client processor 14A have been skipped for the sake of brevity.

Figure 1B:
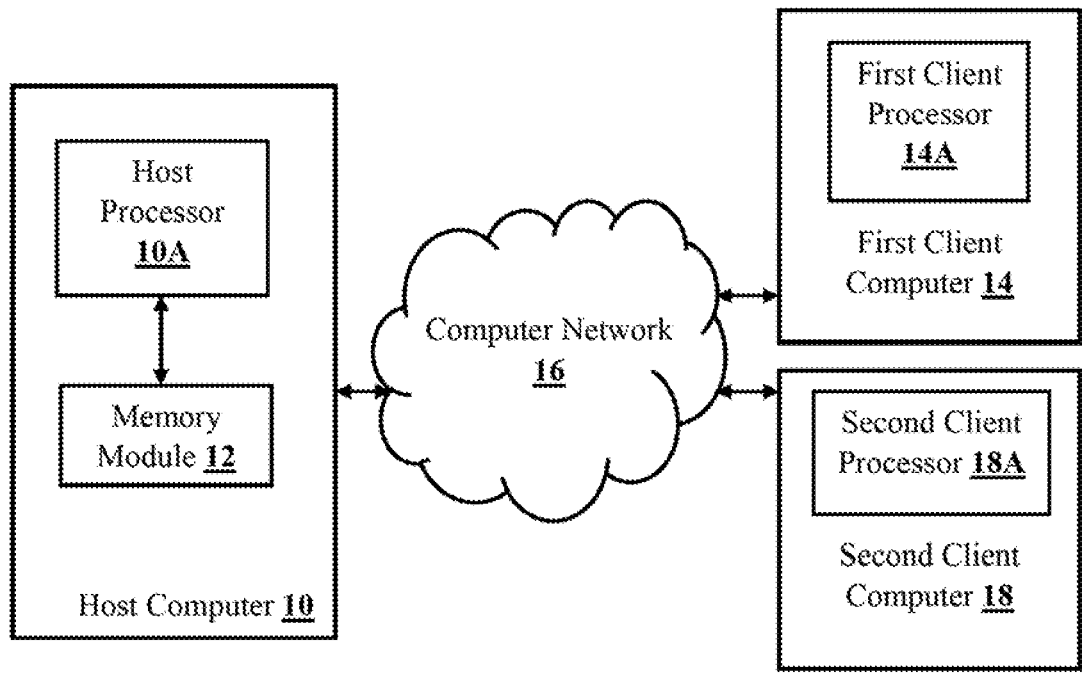
FIG. 1B is a block diagram illustrating an alternative configuration of the computer implemented system that facilitates encoding of configuration information in a file name of a computer executable file, in accordance with an exemplary embodiment of the present disclosure.

Referring to FIG. 1B there is shown a block diagram describing an exemplary embodiment according to which, the host computer 10 is communicably coupled to a first client computer device 14 and a second client computer device 18 respectively, via the computer network 16. Preferably, the host processor computer 10 incorporates the host processor 10A which is functionally coupled to the memory module 12 which in turn is installed within the host computer 10 or is at least functionally coupled to the server computer 10 via a bus (not shown in figures). Further, the first client computer device 14 includes a first client processor 14A installed therein, and the second client computer device 18 includes a second client processor 18A installed therein.

In accordance with the exemplary embodiment of the present disclosure, the host processor 10A is configured to create the 'first computer executable file' (not shown in figures) and structure the filename of the 'first computer executable file' as $FILENAME_1.EXT_1$.

The filename assigned to the 'first computer executable file' is referred to as the 'first filename'. As was the case with the preferred embodiment of the present disclosure, the first computer executable file is an executable file which incorporates the computer program code necessary to install and implement the network security software on any of the end-point computer devices (client computer devices). Additionally, the 'first computer executable file' also includes computer program code facilitating installation of a proprietary checksum generator, computer program code corresponding to checksum verification logic, and a set of default configuration parameters usable in initializing at least the basic functionalities of the network security software, on client computer devices. As was the case with the preferred embodiment of the present disclosure, the 'first computer executable file' incorporating inter-alia the network security software is digitally signed via the process of 'code signing' and is stored on a predetermined memory location of the memory module 12.

In accordance with the exemplary embodiment of the present disclosure, the 'first computer executable file' is associated with 'configuration information' (the configuration information typically embodied in a configuration file which is either a binary file or a text-based file) which inter-alia initializes the network security software incorporated in the 'first computer executable file', post the installation on the first client computer device 14 and second client computer device 18, in-line with the functional requirements of the first client computer device 14 and second client computer device 18 respectively. The 'configuration file' may also, at least in-part, control the execution of the network security software on the first client computer device 14 and second client computer device 18 respectively. The 'configuration information', as was the case with the preferred embodiment of the present disclosure, includes parameters such as model type, model name and operating system type which help classify the first computer executable file as relevant to specific operating systems. The configuration information also includes information indicative of the customer for which the first computer executable file has been created and/or customized. Further, the configuration information may also include any necessary source file information, support file information, language specific help file information, Graphical User Interface (GUI) related information, module name, version number, time of creation, languages the 'the computer program code embodied in the first computer executable file' supports, and the like.

However, in deviation of the phenomenon described in the preferred embodiment of the present disclosure, in this case, the 'network security software' embodied within the 'first computer executable file' is to be installed at two separate client computers, namely, the first client computer device 14 and the second client computer device 18. Further, since the first client computer's (14) functional requirements are different than the functional requirements of the second client computer device 18, consequentially, at least some of the parameters constituting the 'configuration information' necessary for initializing the network security software on the first client computer device 14 are likely to vary from the parameters constituting the 'configuration information' necessary for initializing the network security software on the second client computer device 18.

On account of the variations in the parameters constituting the 'configuration information' required for initializing the network security software on the first client computer device 14 and the second client computer device 18 respectively, the host processor 10A is specifically configured to maintain two versions of the configuration file, namely a 'first configuration file' incorporating the 'configuration information'; with the 'first configuration file' incorporating configuration parameters designed in-line with the functional requirements of the first client computer device 14, and the 'second configuration file' incorporating configuration parameters designed in-line with the functional requirements of the second client computer device 18.

As described earlier, the parameters incorporated in the 'first configuration file' are essentially different than the parameters incorporated in the 'second configuration file'. Further, both the 'first configuration file' and the 'second configuration file' are stored in a 'first memory location' and a 'second memory location' of the memory module 12. Further, the host processor 10A creates a 'first file path' pointing to the 'first storage location' storing the 'first configuration file', and a 'second file path' pointing to the 'second storage location' storing the 'second configuration file'. Further, the 'first file path' and the 'second file path' are considered as the 'metadata' pertaining to the 'first configuration file' and the 'second configuration file' respectively.

In accordance with the exemplary embodiment of the present disclosure, the host processor 10A creates two symbolic links, namely a 'first symbolic link' and a 'second symbolic link', each referencing the 'first computer executable file'. The host processor 10A also assigns filenames to the 'first symbolic link' and a 'second symbolic link'. For instance, the filename of the 'first symbolic link' is FILENAME$_3$.EXT$_3$ and the filename of the 'second symbolic link is FILENAME$_4$.EXT$_4$.

In this case, since both the first client computer device 14 and the second client computer device 18 are designed to download, install and execute the same version of the network security software, both the 'first symbolic link' bearing the exemplary filename 'FILENAME$_3$.EXT$_3$', and the 'second symbolic link' bearing the exemplary filename FILENAME$_4$.EXT$_4$, are configured to point to the (same) storage location (on the memory module 12) storing the 'first computer executable file' embodying the network security software.

In accordance with the exemplary embodiment of the present disclosure, the host processor 10A embeds the metadata corresponding to the 'first configuration file' and the metadata corresponding to the 'second configuration file', i.e. 'first path' and the 'second file path', into the filenames assigned to the 'first symbolic link' and the 'second symbolic link' respectively. Subsequently, the filename of the 'first symbolic link' FILENAME$_3$.EXT$_3$ is restructured as FILENAME$_3$_METADATA.EXT$_3$, while the filename of the 'second symbolic link' is restructured as FILENAME$_4$_METADATA.EXT$_4$. As was the case with the preferred embodiment of the present disclosure, the restructured filenames of the 'first symbolic link' and the 'second symbolic link' are transformed into respective base64 strings. Further, in accordance with the exemplary embodiment of the present disclosure, the filename FILENAME$_3$_METADATA.EXT$_3$ assigned to the 'first symbolic link incorporates the 'first the path' which upon activation points to the 'first storage location' storing the 'first configuration file', while the filename FILENAME$_4$_METADATA.EXT$_4$ assigned to the 'second symbolic link incorporates the 'second file path' which upon activation points to the 'second storage location' storing the 'second configuration file'. As discussed earlier, the parameters incorporated within the 'first configuration file' and the 'second configuration file' are different from one another, and are used to initialize the network security software specifically on the first client computer device 14 and the second client computer device 18 respectively.

In accordance with the exemplary embodiment of the present disclosure, the filenames assigned to the 'first symbolic link' and the 'second symbolic link' respectively, i.e. FILENAME$_3$_METADATA.EXT$_3$ and FILENAME$_4$_METADATA.EXT$_4$ are modified yet again to incorporate respective checksums therein.

Post the inclusion of the checksum, the filename assigned to the 'first symbolic link' is restructured as FILENAME$_3$_METADATA_CHECKSUM.EXT$_3$, while the filename assigned to the second symbolic link' is restructured as FILENAME$_4$_METADATA_CHECKSUM.EXT$_4$. Preferably, the host processor 10A calculates the 'first checksum' and the 'second checksum' checksum based on the filenames assigned to the 'first symbolic link' and the 'second symbolic link' respectively. In case of the 'first symbolic link', the host processor 10A calculates a 'first checksum' based on the filename (FILENAME$_3$_METADATA.EXT$_3$) assigned to the 'first symbolic link'. Similarly, in case of the 'second symbolic link', the host processor 10A calculates a 'second checksum' based on the filename (FILENAME$_4$_METADATA.EXT$_4$) assigned to the 'second symbolic link'. Preferably, the checksum generator is a proprietary software module installed within the host computer 10, which considers the filename assigned to the 'first symbolic link' and the 'second symbolic link' respectively, as inputs and generates respective checksums (first checksum and second checksum) based on the said filenames. Since the process of generating checksums is well-known in the art, any further explanation in this regard is omitted for the sake of brevity.

Subsequently, the host processor 10A transmits the 'first symbolic link' having the filename FILENAME$_3$_METADATA_CHECKSUM.EXT$_3$ and the 'second symbolic link' having the filename FILENAME$_4$_METADATA_CHECKSUM.EXT$_4$, via the computer network 16, onto the first client computer device 14 and the second client computer device 1 respectively. Subsequently, both the first client processor 14A and the second client processor 18A download and execute the 'first computer executable file' and consequentially trigger and facilitate installation of the exemplary network-security software embodied within the 'first computer executable file', onto the first client computer device 14 and second client computer device respectively.

Subsequently, the first client processor 14A and the second client processor 18A digress to decode the filenames assigned to the 'first symbolic link' and the 'second symbolic link' respectively. Preferably, the filenames assigned to the 'first symbolic link' and the 'second symbolic link' are decoded using the base64 algorithm. Following decoding of the 'first symbolic link' and the 'second symbolic link' by first client processor 14A and second client processor 18A respectively, the 'metadata' (first file path and second file path) and the 'checksum' (first checksum and the second checksum) incorporated within the 'first symbolic link' and the 'second symbolic link' are analysed by the first client processor 14A and the second client processor 14A respectively.

During the analysts of the metadata and the checksum incorporated within the filenames assigned to the 'first symbolic link' and the 'second symbolic link' respectively, the first client processor 14A and the second client processor 18A proceed with verifying the integrity of the filenames assigned to the 'first symbolic link' ($FILENAME_3\_METADATA\_CHECKSUM.EXT_3$) and the 'second symbolic link' ($FILENAME_4\_METADATA\_CHECKSUM.EXT_4$) respectively.

Typically, in order to validate the integrity of the first checksum and the second checksum previously embedded into the filenames of the 'first symbolic link' and the 'second symbolic link', the first client processor 14A and the second client processor 18A are required to firstly locally (re)calculate the respective checksums and secondly compare the locally (re)calculated checksums with the respective original checksums (i.e. the first checksum and the second checksum). Ideally, to locally (recalculate the checksum, the first client processor 14A and the second client processor 18A should use the same proprietary checksum generator and the same information (i.e. filename assigned to the symbolic link) which were used earlier by the host processor 10A to calculate the original checksum, in order to obviate any chances of the original checksums (i.e. the first checksum and the second checksum) being different than the locally computed checksums, not on the account of loss of integrity of the filename assigned to the symbolic link, but on account of different intrinsic functional characteristics associated with the different checksum generators used by the host processor 10A and the first client processor 14A and the second client processor 18A. In view of the foregoing requirement, it is preferable that the (same) proprietary checksum generator and the corresponding proprietary checksum verification logic are rendered accessible to the first client processor 14A as well as the second client processor 18A, at least during the process of verification of the integrity of the filenames assigned to the 'first symbolic link' and the 'second symbolic link' respectively. Therefore, the proprietary checksum generator and the corresponding, proprietary checksum verification logic are incorporated into the 'first computer executable file' by the host processor 10A, preferably a priori to the creation of the symbolic links (first symbolic link and second symbolic link) referencing the storage location of the 'first computer executable file', and a priori to the symbolic links being transmitted to the first client computer device 14 and the second client computer device 18.

Subsequently, when the first client processor 14A and the second client processor 18A analyse the 'first symbolic link' and the 'second symbolic link' and proceed with downloading the 'first computer executable file' referenced by the 'first symbolic link' and the 'second symbolic link', onto the first client computer 14 and the second client computer 18, the respective client processors, i.e. first client processor 14A and the second client processor 18A are provided with access to the proprietary checksum generator and the corresponding proprietary checksum verification logic embodied within the 'first computer executable file'. Further, with the first client processor 14A and second client processor IRA receiving the respective symbolic links (i.e. the first symbolic link and the second symbolic link), the filenames assigned to the respective symbolic links are also made known respectively to the first client processor 14A and the second client processor 18A; with the filenames assigned to the first symbolic link and the second symbolic link being previously used as inputs by the host processor 10A to facilitate calculation of the first checksum and the second checksum respectively. In this manner, the first client processor 14A and the second client processor 18A are provided with access to the same proprietary checksum generator as well as the same set of input information (i.e. the filenames assigned to the first symbolic link and the second symbolic link respectively), which were used previously in combination by the host processor 10A to calculate the first checksum and the second checksum.

Accordingly, the first client processor 14A and the second client processor 18A make use of the same checksum generator and the same set of input information (i.e. the filename assigned to the symbolic link) to locally compute respective checksums. Typically, since the host processor 10A and both the first client processor 14A and second client processor 18A use the same proprietary checksum calculator and the same set of input information (i.e. the filename of the symbolic link) as the basis for calculating the respective checksums, the checksums locally calculated by the first client processor 14A and the second client processor 18A respectively, should be equivalent to the first checksum and the second checksum calculated previously by the host processor 10A a priori to transmission of the 'first symbolic link' and the 'second symbolic link' to the first client computer 14 and the second client computer 18.

Post a comparison between the 'first checksum' and the checksum locally computed by the first client processor 14A, if the checksum locally computed by the first client processor 14A is not equivalent to the 'first checksum' calculated by the host computer 10A a priori to the transmission of the 'first symbolic link', then the client processor 14A concludes that the 'first symbolic link' has been tampered in transit and a priori to being downloaded onto the first client computer 14. Further, post a comparison between the 'second checksum' and the checksum locally computed by the second client processor 18A, if the checksum locally computed by the second client processor 18A is not equivalent to the 'second checksum' calculated by the host computer 10A a priori to the transmission of the 'second symbolic link', then the second client processor 18A concludes that the 'second symbolic link' has been tampered in transit and a priori to being downloaded onto the second client computer 18.

Alternatively, if the checksum locally computed by the first client processor 14A is determined to be equivalent to the 'first checksum' calculated by the host computer 10A a priori to the transmission of the 'first symbolic link', then the first client processor 14A determines that the filename assigned to the 'first symbolic link' has not been wrongfully manipulated or corrupted, and accordingly determines the storage location of the 'first configuration file' based on the analysis of the 'metadata' (i.e. the first file path) embedded within the filename assigned to the 'first symbolic link'. Subsequently, the first client processor 14A downloads the 'first configuration file' onto the first client computer device 14 and initializes the network security software installed therein, on the basis of the 'configuration information' incorporated within the 'first configuration file'. Further, if the checksum locally computed by the second client processor 18A is determined to be equivalent to the 'second checksum' calculated by the host computer 10A a priori to the transmission of the 'second symbolic link', then the second client processor 18A concludes that the filename assigned to the 'second symbolic link' has not been wrongfully manipulated or corrupted, and accordingly determines the storage location of the 'second configuration file' based on the analysis of the 'metadata' (i.e. the second file path) embedded within the filename assigned to the 'second symbolic link'. Subsequently, the second client processor 18A downloads the 'second configuration file' onto the second client computer device 18 and initializes the network security software installed therein, on the basis of the 'configuration information' incorporated within the 'second configuration file'.

Alternatively, if the checksum locally computed bye the first client processor 14A is found to be different than the first checksum calculated by the host computer 10A a priori to the transmission of the 'first symbolic link', then the first client processor 14A concludes that the filename of the 'first symbolic link' has been wrongfully manipulated or corrupted, and accordingly foregoes downloading the 'fast configuration file' (embodying configuration information necessary for initializing the network security software installed on the first client computer device 14) from the 'first storage location' on the memory module 12 referenced by the 'metadata' (i.e. the first, file path) embedded within the filename assigned to the 'first symbolic link'. Consequentially, the first client processor 14A also aborts the initialization of the network security software (installed on the first client computer 14) owing to the fact that the corresponding 'first configuration file' necessary for the initialization has either been corrupted or wrongfully manipulated. While it is preferable that the first client processor 14A aborts the download of the 'first configuration file' subsequent to determining that the integrity of the filename assigned to the 'first symbolic link' has been corrupted/wrongfully manipulated, it is also possible that the first client processor 14A, in addition to aborting the download of the 'configuration file' from the memory module 12, selects to initialize the network security software installed on the first client computer device 14, using the 'default configuration parameters' preferably extracted from the 'first computer executable file' downloaded onto the first client computer 14.

Similarly, if the checksum locally computed by the second client processor 18A is found to be different than the second checksum calculated by the host computer 10A a priori to the transmission of the 'second symbolic link', then the second client processor 18A concludes that the filename of the 'second symbolic link' has been wrongfully manipulated or corrupted, and accordingly foregoes downloading the 'second configuration file' (embodying configuration information necessary for initializing the network security software installed on the second client computer device 18) from the 'second storage location' on the memory module 12 referenced by the 'metadata' (i.e. the second file path) embedded within the filename assigned to the 'second symbolic link'. Consequentially, the second client processor 18A also aborts the initialization of the network security software (installed on the second client computer 18) owing to the fact that the corresponding 'second configuration file' necessary for the initialization has either been corrupted or wrongfully manipulated. While it is preferable that the second client processor 18A aborts the download of the 'second configuration file' subsequent to determining that the integrity of the filename assigned to the 'second symbolic link' has been corrupted/wrongfully manipulated, it is also possible that the second client processor 18A, in addition to aborting the download of the 'configuration file' from the memory module 12, selects to initialize the network security software installed on the second client computer device 18, using the 'default configuration parameters' preferably extracted from the 'second computer executable file' downloaded onto the second client computer 18.

In the manner described hitherto, the host processor 10A promotes large-scale yet seamless installation of 'network security software' across a plurality of client computer devices (end-point computer devices) by maintaining the version of the 'network security software' as same for all the client computer devices, and modifying only the configuration information necessary for initializing the network security software, in-line with the functional requirements associated with each of the client computer devices, and creating customized 'configuration files' comprising configuration parameters specifically adapted in-line with the functional requirements of the corresponding client computer devices.

By treating the network security software and the 'configuration file' necessary for initializing the network security software post the installation, as disparate program files, the system and method envisaged by the present disclosure aims to promote large scale, near simultaneous installation of the network security software across a multitude of end-point computer devices, despite each of the end-point computer devices (for instance, first client computer device 14 and second client computer device 18) having diversified functional requirements owing to the fact that each of them belong to different tenants and execute a diversified set of operations In view of the diversified functional requirements associated with each of the end-point computer devices, the system and method envisaged by the present disclosure facilitate creating multiple copies of the 'configuration file', with each configuration file being specifically customized to suit the diversified functional requirements of each of the client computer devices (end-point computer devices). Further, given the diversity in the functional requirements associated with each of the end-point computer devices, the implementation of the system and method envisaged by the present disclosure ensures that it is the 'configuration file' embodying the 'configuration information' necessary for initializing the network security software on each of the end-point computer devices, which needs to be modified in order to cater to the diversified functional requirements, while the structure of the network security software embodied within the 'first computer executable file' remains unchanged.

Further, even if the functional requirements of any of the end-point computer devices changes in an abrupt, unanticipated manner, the implementation of the system and method of the present disclosure covers such an abrupt, unanticipated change (in the functional requirements), by facilitating a quick modification of only the configuration parameters incorporated with the configuration file corresponding to the said end-point computer device, keeping the structure of the first computer executable file embodying the network security software intact and unchanged all the while.

Further, the present disclosure envisages storing the 'first computer executable file' embodying the network security software on a predetermined memory location of the memory module. The present disclosure also envisages storing multiple versions of the 'configuration file'—each version embodying configuration parameters specifically customized to suit the diversified requirements of individual end-point computer devices—on predetermined memory locations of the memory module which are in-turn referenced and rendered accessible via respective file paths. The system and method envisaged by the present disclosure abstains from transmitting neither the 'first computer executable file' nor the 'configuration files' directly onto each of the end-point computer devices, and instead transmits to each of the end-point computer devices, a symbolic link which references the storage location of the 'first computer executable file' embodying the network security software, and a file path that references the storage location of the 'configuration file' which has been specifically customized to suit the functional requirements of a corresponding end-point computer device, as far as the initialization of the network security software is concerned. Further, the system and method envisaged by the present disclosure also abstains from directly transmitting the file paths to respective/corresponding end-point computer devices, but chooses to encode the 'file paths' in respective symbolic link files (the symbolic link files referencing the storage location of the 'first computer executable file), which are in turn transmitted to each of the end-point computer devices for facilitating download of the first computer executable file', and the installation of the corresponding network security software thereon.

Referring to FIG. 2A and FIG. 2B in combination, there is shown a flowchart illustrating the steps involved in the computer implemented method for encoding configuration information in a filename of a computer executable file. The method begins at step 200 where a host processor (denoted by reference numeral 10A in FIG. 1) installed within a host computer (denoted by reference numeral 10 in FIG. 1) creates a 'first computer executable file' and assigns a first filename to the 'first computer executable file before storing it in a predetermined memory location of a memory module (denoted by reference numeral 12 in FIG. 1) installed within the host computer. Further, the 'first name' assigned to the 'first computer executable file' is structured as $FILENAME_1.EXT_1$. The first computer executable file is preferably an executable file which incorporates network security software programmed to execute a network security policy and execute multi-level network security protection on client computer devices (denoted by reference numeral 14 in FIG. 1) post download and installation thereon. Preferably, the 'first computer executable file' incorporates the executable program code necessary to install and implement the network security software. The 'first computer executable file' created by the host processor is subjected to the process of 'code signing' which in turn authenticates the underlying program code by digitally signing the program code and by consequentially confirming the validity of the program code, and the identity of the author (of the program code).

At step 202, the host processor determines configuration information corresponding to the 'first computer executable file'. Essentially, the 'configuration information' initializes the network security software embodied in the 'first computer executable file' subsequent to the network security software being installed on a client computer device. The 'configuration information' is also necessary to control the execution of the network security software on the client computer device. Further, the 'configuration information' corresponding to the network security software incorporated into the 'first computer executable file' is embodied into a configuration file, and the configuration file is stored in a predetermined memory location of the memory module.

At step 204, the host processor extracts a file path denoting the memory location of the memory module on which the configuration file is stored. The file path directing to the storage location of the configuration file is construed as metadata corresponding to the configuration file. Further, at step 206, the host processor creates a symbolic link referencing the 'first computer executable file'. Essentially, the symbolic link, upon activation directs to the memory location (on the memory module of the host computer) storing the 'first computer executable file'. Further, the host computer assigns a filename to the symbolic link—also referred to as the 'second filename'—and structures the second filename as '$FILENAME_2.EXT_2$'.

At step 208, the host processor modifies the (second) filename assigned to the symbolic link by incorporating within the said filename, the metadata corresponding to the configuration file, i.e. the file path. Essentially, after the execution of the step 208, while the symbolic link references the 'first computer executable file' and points to the memory location where the 'first computer executable file' is stored, the filename assigned to the symbolic link incorporates the metadata i.e. the file path which directs to the memory location (of the memory module) storing the 'configuration file' corresponding to the 'first computer executable file' and necessary for initializing the network security software embodied within the 'first computer executable file'. Prior to the inclusion of the metadata into the filename of the symbolic link, the filename (of the symbolic link) was denoted by the term 'second filename' and as structured as '$FILENAME_2.EXT_2$'. But subsequent to the inclusion of the metadata into the filename of the symbolic link, the filename (of the symbolic link) is denoted using the term 'modified filename'. Here onwards, the term 'modified filename' as described above is used to denote the filename (of the symbolic link) which also incorporates the metadata corresponding to the configuration file. Preferably, the structure of the second filename which was $FILENAME_2.EXT_2$ prior to the incorporation of the metadata therein, changes to the format $FILENAME_2\_METADATA.EXT_2$ post the incorporation of the metadata therein.

At step 210, the host processor calculates a checksum based on the filename (now referred to as modified filename and structured as $FILENAME_2\_METADATA.EXT_2$) assigned to the symbolic link. Preferably, the checksum generator—used by the host processor to calculate the checksum—is a proprietary software module installed within the host computer, which considers the filename assigned to the symbolic link as an input and generates a checksum based on the said filename. The checksum generator also embeds the checksum generated on the basis of the filename of the symbolic link, into the filename of the symbolic link. Since the process of generating a checksum is well-known in the art, any further explanation in this regard is omitted for the sake of brevity. Further, for the sake of explanation and easy reference, the checksum generated by the host processor as explained above is referred to as 'original checksum' hereafter.

At step 212, the checksum thus calculated is also encoded within the filename assigned to the symbolic link thereby causing for the structure of the filename to be changed from FILENAME2_METADATA.EXT2 to FILENAME2_METADATA_CHECKSUM.EXT2. The checksum thus calculated and subsequently incorporated into the filename of the symbolic link would not be known outside the memory module of the host computer. Even when the filename assigned to the symbolic link is restructured as $FILENAME_2\_METADATA\_CHECKSUM.EXT_2$ with the inclusion of the checksum thereto, the checksum, even though appended to the metadata is hidden from being displayed and also hidden from the view of a user using the client computer device. Since, the checksum is prevented from being displayed and viewed, it is apparent that a hacker attempting to manipulate the either the symbolic link or the filename assigned to the symbolic link or both, would be unable to neither appreciate the presence of the checksum nor duplicate the checksum. Preferably, the checksum is encoded into the filename assigned to the symbolic link, using the base64 algorithm, and the filename which was restructured from $FILENAME_2\_METADATA.EXT_2$ to $FILENAME_2\_METADATA\_CHECKSUM.EXT_2$ post the inclusion of the checksum thereto, is represented as a base64 string.

Subsequent to the addition of the checksum into the filename assigned to the symbolic link, the filename of the symbolic link is transformed into a combination of the metadata (the metadata being a file path pointing to the memory location storing the configuration file incorporating 'configuration information' necessary to initialize the network security software embodied in the 'first computer executable file', on the client computer device) and the checksum (the checksum being generated based at-least in part on the filename assigned to the symbolic link), with the said combination being denoted using the format $FILENAME_2\_METADATA\_CHECKSUM.EXT_2$.

At step 214, the symbolic link having its filename structured as $FILENAME_2\_METADATA\_CHECKSUM.EXT_2$, is transmitted from the host processor to the client computer device over a computer network. Subsequently, at step 216, the client processor installed within the client computer receives and processes the symbolic link (i.e. a link referencing, the memory location storing the 'first computer executable file'), and the metadata (i.e. file path) embedded within the filename assigned to the symbolic link.

In accordance with the preferred embodiment of the present disclosure, the client processor accesses the storage location (on the memory module) referenced by the symbolic link and initiates a download of the 'first computer executable file' that incorporates inter-alia the exemplary network-security software. Subsequently, the client processor executes the downloaded 'first computer executable file' and consequentially the software program code embodied therein to trigger and facilitate installation of the corresponding network-security software on the client computer device. With the installation of the network-security software on the client computer device being complete, the client processor analyses the filename assigned to the symbolic link file, so as to decode and analyze the metadata referencing the storage location of the 'configuration file' necessary for initializing the network-security software on the client computer post the installation. Preferably, the client processor decodes the filename assigned to the symbolic link using the base64 algorithm and deciphers the 'metadata' (referencing the storage location of the 'configuration file') and the 'checksum' originally computed and embedded into the filename by the host processor a priori to the transmission of the symbolic link file onto the client computer.

Following the analysis of the filename assigned to the symbolic link, the client processor validates/verifies the integrity of the filename, so as to ensure that the filename assigned to the symbolic link is not corrupted/wrongfully manipulated while in transit via the computer network 16 and a priori to the symbolic link being downloaded onto the client computer 14. At step 218, in order to validate the integrity of the checksum previously calculated (original checksum) and embedded into the filename of the symbolic link by the host processor, the client processor locally (re)calculates the checksum and subsequently compares the locally (re)calculated checksum with the original checksum. Preferably, to locally (re)calculate the checksum, the client processor should use the same proprietary checksum generator and the same information (i.e. filename assigned to the symbolic link) which were used earlier by the host processor to calculate the original checksum, in order to obviate any chances of the original checksum being different than the locally computed checksum, not on the account of loss of integrity of the filename assigned to the symbolic link, but on account of different intrinsic functional characteristics associated with the different checksum generators used by the host processor and the client processor. In view of the aforementioned requirement, it is preferable that the (same) proprietary checksum generator and the corresponding proprietary checksum verification logic are rendered accessible to the client processor as well, at least during the verification of the integrity of the filename assigned to the symbolic link. Preferably, the proprietary checksum generator and the corresponding proprietary checksum verification logic are incorporated into the 'first computer executable file' by the host processor, preferably a priori to the creation of the symbolic link referencing the storage location of the 'first computer executable file', and a priori to the symbolic link being transmitted to the client complier device. Consequentially, when the client processor 14A analyses the symbolic link and downloads the 'first computer executable file' referenced by the symbolic link, onto the client computer 14, the client processor 14A is provided with access to the proprietary checksum generator and the corresponding proprietary checksum verification logic embodied within the 'first computer executable file'. Further, with the client processor 14A receiving the symbolic link, the filename assigned to the symbolic link is also made known to the client processor 14A; the filename assigned to the symbolic link being previously used as an input by the host processor 10A to facilitate calculation of the original checksum. In this manner, the client processor 14A is provided with access to the same proprietary checksum generator as well as the same set of input information (i.e. the filename assigned to the symbolic link), which were used previously in combination by the host processor 10A to calculate the original checksum.

Accordingly, the client processor 14A uses the same checksum generator and the same set of input information (i.e. the filename assigned to the symbolic link) to locally compute a checksum (referred to as 'locally computed checksum' hereafter). Typically, since both the host processor 10A and the client processor 14A use the same proprietary checksum calculator and the same set of input information (i.e. the filename of the symbolic link) as the basis for calculating the 'original checksum' and the locally computed checksum' respectively, both the checksums should turn out to be equivalent, unless the symbolic link has been wrongfully manipulated or corrupted, while in transit to the client computer 14 and a priori to the symbolic link being downloaded by the client processor 14A.

Further, at step 220, the client processor compares the locally computed checksum with the original checksum (the 'original checksum' being the checksum calculated and embedded into the filename assigned to the symbolic link, by the host processor, a priori to transmitting the symbolic link to the client computer), and determines whether the locally computed checksum is equivalent to the original checksum. Post comparison, if the locally computed checksum is determined to be equivalent to the originally calculated checksum, the control moves to step 222 wherein then the client processor determines that the symbolic link which had been transmitted from the host processor has not been tampered with and that the symbolic link constitutes a legitimate computer executable file. Additionally, the phenomenon of the locally computed checksum, being equivalent to the original checksum also confirms the integrity of the filename assigned to the symbolic link received and analysed by the client processor.

Consequentially, the control moves to step 224 where the client processor determines the storage location of the 'configuration file' based on the analysis of the 'metadata' embedded within the filename assigned to the symbolic link, and subsequently proceeds with downloading the 'configuration file' onto the client computer device and initializing the network security software installed therein, on the basis of the 'configuration information' incorporated within the 'configuration file' (step 226).

Referring to step 220 again, if the client processor determines that the locally computed checksum is not equivalent to the original checksum (the 'original checksum' being the checksum calculated and embedded into the filename assigned to the symbolic link, by the host processor, a priori to transmitting the symbolic link to the client computer), then the control moves to step 228 wherein the client processor concludes, given the disparity between the locally computed checksum and the originally computed checksum, that the filename of the symbolic link has been wrongfully manipulated or corrupted, and accordingly foregoes downloading the 'configuration file' (embodying configuration information necessary for initializing the network security software installed on the client computer device) from the storage location on the memory module referenced by the 'metadata' embedded within the filename assigned to the symbolic link. Consequentially, the client processor also aborts the initialization of the (installed) network security software owing to the fact that the corresponding 'configuration file' necessary for the initialization has either been corrupted or wrongfully manipulated, and requests the host processor to retransmit the said symbolic link (step 230). While the preferred embodiment of the present disclosure describes the client processor as aborting the download of the 'configuration file' subsequent to determining that the integrity of the filename assigned to the symbolic link has been corrupted/wrongfully manipulated, it is also possible that the client processor in addition to aborting the download of the 'configuration file' from the memory module, selects to initialize the network security software installed on the client computer device, using 'default configuration parameters' preferably extracted from the 'first computer executable file' downloaded onto the client computer.

TECHNICAL ADVANTAGES

The technical advantages envisaged by the present disclosure include the realization of a computer implemented method, a corresponding system and a computer program product that facilitate encoding of configuration information (necessary for deploying a software on a computer) as a part of the filename corresponding to the software program. The filename of the software is modified preferably at a server, and before the software program is transmitted to computer devices (preferably end-points) situated across a computer network. The present disclosure, by facilitating encoding of configuration information as a part of the filename of the software, obviates the need, firstly on the part of the server to transfer the software program and the corresponding configuration information as separate files to each of the end-point computer devices, and secondly, on the part of each of the end-point computer devices to initiate two separate download operations for downloading the software and the corresponding configuration information respectively.

Further, the present disclosure, by the way of provisioning for the configuration information to be embedded within the filename of the software, ensures that a single instance (copy) of the software can be transmitted to multiple end-point computer devices, with only the filename of the software being changed/manipulated dynamically based on the end-point at which it is purported to be installed. In this way the present disclosure ensures that multiple instances (copies) of the software and multiple instances of the corresponding binary information file are not necessitated. Further, by obviating the need for multiple instances of the software and the corresponding binary information files, the present disclosure also saves on the computational resources and storage resources necessary for creating and storing the multiple software instances and the corresponding binary information files. Further, by obviating the need for multiple instances of the software and the corresponding binary information files, the present disclosure also obviates the need for each of the software instances to be individually signed using an operating system private key, thereby saving on the computational resources required for individually signing each of the software instances.

Further, the present disclosure, by the way of provisioning for the configuration information to be embedded within the filename of the software, also obviates the need for a file path—directing to a remote host storing the configuration information corresponding to each of the software instances—to be encoded into each of the software instances, for a download by the respective end-points during the deployment of the software instances. Further, the present disclosure also provides for a single-click, single link based, zero-touch seamless installation of software onto end-points devices. Further, the present disclosure also provides for a single software instance to be dynamically customized multiple times by the way of manipulation of the filename in order to suit the requirements set forth by different end-point computer devices. The present disclosure also promotes mass-scale, simultaneous installation of software on multitude of end-point computer devices situated across a computer network.

What is claimed is:

1. A computer implemented method for encoding configuration information in a filename of a computer executable file, said method comprising the following computer implemented steps:

creating, at a host computer having a host processor, a first computer executable file incorporating at least one application program therein, and storing said first computer executable file on a memory module of said host computer;

determining, by said host processor, configuration information corresponding to said first computer executable file, and representing said configuration information as a configuration file, and storing said configuration file on said memory module;

determining metadata corresponding to said configuration file embodying said configuration information, wherein said metadata includes at least a file path directing to a storage location of said configuration file on said memory' module;

creating at least one symbolic link referencing said first computer executable file, and assigning a filename to said symbolic link;

modifying said filename assigned to said symbolic link, by encoding said metadata into a portion of said filename, and thereby creating a modified filename, and assigning said modified filename to said symbolic link;

generating a checksum based on said modified filename, and embedding said checksum into said modified filename, wherein said checksum is embedded into said portion of the modified filename incorporating said metadata, thereby transforming said modified filename into a combination of said metadata and said checksum;

transmitting said symbolic link assigned with said modified filename, to a remote client computer having a client processor installed therein, over a computer network;

triggering said client processor to receive and analyze said symbolic link, and further triggering said client processor to download onto said client computer, said first computer executable file referenced by said symbolic link, and still further triggering said client processor to install onto said client computer, said application program incorporated within said first computer executable file, wherein said client processor is triggered to only install said application program and hold-off initialization of said application program, unless said modified filename assigned to said received symbolic link and said metadata incorporated within said modified filename are established to have been untampered before being received and analyzed by said client processor; processing, by said client processor, said modified filename assigned to received symbolic link, and locally computing, by said client processor, a second checksum based on said modified filename assigned to said received symbolic link;

comparing said second checksum with said checksum originally embedded within said modified filename by said host processor prior to transmitting said symbolic link onto said client computer, and determining whether said checksum is equivalent to said second checksum;

responsive to determining said checksum to be equivalent to said second checksum, concluding that said modified filename assigned to said received symbolic link and said metadata incorporated within said modified filename have not been tampered prior to being downloaded onto said client computer;

responsive to determining that said modified filename and said metadata incorporated therein have not been tampered prior to being downloaded onto said client computer, triggering said client processor to determine, based on said metadata encoded within said modified filename, a file path referencing a storage location of said configuration file on said memory module;

triggering said client processor to extract said configuration file based on said file path, only in an event said modified filename and said metadata incorporated therein are determined as being untampered, and further triggering said client processor to initialize said application program installed onto said client computer, based on said configuration information embodied within said configuration file;

responsive to determining that said modified filename and said metadata incorporated therein have been tampered prior to being downloaded onto said client computer by said client processor, triggering said client processor to abort downloading said configuration file from said storage location referenced by said metadata;

triggering said client processor to download a set of default configuration parameters from a predetermined storage location of said memory module, instead of downloading said configuration file from said storage location referenced by said metadata; and further triggering said client processor to initialize said application program installed onto said client computer, based on said default configuration parameters.

2. The method as claimed in claim 1, wherein the step of creating a first computer executable file, further includes the step of digitally signing said first computer file using digital signature standards selected from a group consisting of Elliptic Curve Digital Signature Algorithm (ECDSA), RSA algorithm, and Edwards-curve Digital Signature algorithm.

3. The method as claimed in claim 1 wherein the step of assigning a filename to said symbolic link, further includes the step of structuring said filename as $FNAME_2.EXT_2$.

4. The method as claimed in claim 1, wherein the step of modifying said filename and creating said modified filename, further includes the step of structuring said modified filename as $FNAME_2\_METADATA.EXT_2$.

5. The method as claimed in claim 1, wherein the step of encoding said configuration information into a portion of said filename and creating a modified filename, further includes the step of converting said modified filename into a base64 string.

6. A computer implemented system for encoding configuration information in a filename of a computer executable file, said system comprising a host processor installed in a host computer, and a client processor installed in a client computer, said host processor communicably coupled to said client processor; said host processor configured to:

create a first computer executable file incorporating at least one application program therein, and store said first computer executable file on a memory module of said host computer;

determine configuration information corresponding to said first computer executable file, and represent said configuration information as a configuration file, and further store said configuration file on said memory module;

determine metadata corresponding to said configuration file, wherein said metadata includes at least a file path directing to a storage location of said configuration file on said memory module;

create at least one symbolic link referencing said first computer executable file, and assign a filename to said symbolic link;

modify said filename assigned to said symbolic link, by encoding said metadata into a portion of said filename, and create a modified filename, and further assign said modified filename to said symbolic link;

generate a checksum based on said modified filename, and embed said checksum into said modified filename, wherein said checksum is embedded within said portion of the modified filename incorporating said metadata, thereby transforming said modified filename into a combination of said metadata and said checksum;

transmit said symbolic link assigned with said modified filename, over said computer network, to said client computer having said client processor installed therein;

said client processor configured to receive and analyze said symbolic link, said client processor further configured to:

download onto said client computer, said first computer executable file referenced by said symbolic link, and install onto said client computer, said application program incorporated within said first computer executable file, wherein said client processor is configured to only install said application program and hold-off initialization of said application program, unless said modified filename assigned to said received symbolic link and said metadata incorporated within said modified filename are established to have been untampered before being received and analyzed by said client processor;

process said modified filename assigned to received symbolic link, and locally compute a second checksum based on said modified filename assigned to said received symbolic link;

compare said second checksum with said checksum originally embedded within said modified filename by said host processor prior to transmission of said symbolic link onto said client computer, and determine whether said checksum is equivalent to said second checksum;

responsive to determining said checksum to be equivalent to said second checksum, ascertain that said modified filename assigned to said received symbolic link and said metadata incorporated within said modified filename have not been tampered prior to being downloaded onto said client computer;

responsive to determining that said modified filename and said metadata incorporated therein have not been tampered prior to being downloaded onto said client computer, further determine, based on said metadata encoded within said modified filename, a file path referencing a storage location of said configuration file on said memory module;

extract, only in an event said modified filename and said metadata incorporated therein are determined as being untampered, said configuration file based on said file path, and initialize said application program installed onto said client computer, based on said configuration information embodied within said configuration file;

responsive to determining that said modified filename and said metadata incorporated therein have been tampered prior to being downloaded onto said client computer, aborts downloading said configuration file from said storage location referenced by said metadata, and downloads, instead of said configuration file, a set of default configuration parameters from a predetermined storage location of said memory module' and initializes said application program installed onto said client computer, based on said default configuration parameters.

7. The system as claimed in claim 6, wherein said host processor is further configured to digitally sign said first computer file using digital signature standards selected from a group consisting of Elliptic Curve Digital Signature Algorithm (ECDSA), RSA algorithm, and Edwards-curve Digital Signature algorithm.

8. The system as claimed in claim 6, wherein said host processor is further configured to structure said filename assigned to said symbolic link as $FNAME_2.EXT_2$, said host processor still further configured to structure said modified filename as $FNAME_2\_METADATA.EXT_2$.

9. The system as claimed in claim 6, wherein said host processor is communicably coupled to said memory module, said host processor further configured to selectively store said checksum corresponding to said modified filename at a predetermined location of said memory module.

10. A non-transitory computer readable storage medium having computer-readable instructions stored thereupon, the instructions when executed by a computer processor, cause the computer processor to:

create a first computer executable file incorporating at least one application program therein, and store said first computer executable file on a memory module of said host computer;

determine configuration information corresponding to said first computer executable file, and represent said configuration information as a configuration file, and further store said configuration file on said memory module;

determine metadata corresponding to said configuration file, wherein said metadata includes at least a file path directing to a storage location of said configuration file on said memory module;

create at least one symbolic link referencing said first computer executable tile, and assign a filename to said symbolic link;

modify said filename assigned to said symbolic link, by encoding said metadata into a portion of said filename, and create a modified filename, and further assign said modified filename to said symbolic link;

generate a checksum based on said modified filename, and embed said checksum into said modified filename, wherein said checksum is embedded within said portion of the modified filename incorporating said metadata, thereby transforming said modified filename into a combination of said metadata and said checksum;

transmit said symbolic link assigned with said modified filename, over a computer network, to a client computer having a client processor installed therein;

trigger said client processor to receive and analyze said symbolic link, and further trigger said client processor to download onto said client computer, said first computer executable file referenced by said symbolic link, and further trigger said client processor to install onto said client computer, said application program incorporated within said first computer executable file, wherein said client processor is triggered to only install said application program and hold-off initialization of said application program, unless said modified filename assigned to said received symbolic link and said metadata incorporated within said modified filename are established to have been untampered before being received and analyzed by said client processor;

trigger said client processor to process said modified filename assigned to received symbolic link, and further trigger said client processor to locally compute a second checksum based on said modified filename assigned to said received symbolic link;

trigger said client processor to initiate a comparison between said second checksum with and said checksum originally embedded within said modified filename by said host processor, prior to transmitting said symbolic link onto said client computer, and further trigger said client processor to determine whether said checksum is equivalent to said second checksum;

in response to determining said checksum is to be equivalent to said second checksum, trigger said client processor to conclude ascertain that said modified filename assigned to said received symbolic link and said metadata incorporated within said modified filename have not been tampered prior to being downloaded onto said client computer;

in response to determining that said modified filename and said metadata incorporated therein have not been tampered prior to being downloaded onto said client computer by said client processor, trigger said client processor to determine, based on said metadata encoded within said modified filename, a file path referencing a storage location of said configuration file on said memory module;

trigger said client processor to extract said configuration file based on said file path, only in an event said modified filename and said metadata incorporated therein are determined as being untampered, and initialize said application program installed onto said client computer, based on said configuration information embodied within said configuration file;

in response to determining that said modified filename and said metadata incorporated therein have been tampered before being downloaded onto said client computer, to abort downloading said configuration file from said storage location referenced by said metadata; and trigger said client processor to download a set of default configuration parameters from a predetermined storage location of said memory module instead of said configuration tile, and initialize said application program installed onto said client computer, based on said default configuration parameters.

11. The computer readable instructions as claimed in claim 10, wherein the computer-readable instructions when executed by said computer processor, further cause the computer processor to:

digitally sign said first computer file using digital signature standards selected from a group consisting of Elliptic Curve Digital Signature Algorithm (ECDSA), RSA algorithm, and Edwards-curve Digital Signature algorithm;

structure said filename assigned to said symbolic link as FNAME2.EXT2, and structure said modified filename as FNAME2 METADATA.EXT2; and selectively store said checksum corresponding to said modified filename, in a memory module communicably coupled thereto.

* * * * *